(12) United States Patent
Hunt et al.

(10) Patent No.: US 12,298,212 B2
(45) Date of Patent: *May 13, 2025

(54) SYSTEMS FOR AUTOMATED PREPARATION OF BIOLOGICAL SPECIMENS

(71) Applicant: HOLOGIC, INC., Marlborough, MA (US)

(72) Inventors: Barry F. Hunt, Andover, MA (US); Raymond Jenoski, Boylston, MA (US); Ryan Oliva, Mendon, MA (US); Michael Cordeiro, Warwick, RI (US); Eric Grimes, Hopedale, MA (US)

(73) Assignee: Hologic, Inc., Marlborough, MA (US)

( * ) Notice: Subject to any disclaimer, the term of this patent is extended or adjusted under 35 U.S.C. 154(b) by 26 days.

This patent is subject to a terminal disclaimer.

(21) Appl. No.: 18/056,680

(22) Filed: Nov. 17, 2022

(65) Prior Publication Data

US 2023/0109714 A1    Apr. 13, 2023

Related U.S. Application Data

(63) Continuation of application No. 17/133,690, filed on Dec. 24, 2020, now Pat. No. 11,536,634, which is a
(Continued)

(51) Int. Cl.
*G01N 1/31* (2006.01)
*G01N 1/28* (2006.01)
(Continued)

(52) U.S. Cl.
CPC .......... *G01N 1/312* (2013.01); *G01N 1/2813* (2013.01); *G01N 35/00029* (2013.01);
(Continued)

(58) Field of Classification Search
None
See application file for complete search history.

(56) References Cited

U.S. PATENT DOCUMENTS

| 5,143,627 A | 9/1992 | Lapidus et al. |
| 5,240,606 A | 8/1993 | Lapidus et al. |

(Continued)

FOREIGN PATENT DOCUMENTS

| AU | 2006235787 A1 | 11/2006 |
| CN | 101370622 A | 2/2009 |

(Continued)

OTHER PUBLICATIONS

Foreign OA for KR Patent Appln. No. 10-2022-7028531 dated May 26, 2023 (with English translation).
(Continued)

*Primary Examiner* — Brian R Gordon
(74) *Attorney, Agent, or Firm* — Vista IP Law Group LLP; Charles B. Cappellari; Ted Allen

(57) ABSTRACT

An automated system for processing a sample contained in a liquid sample container includes an automated tool head configured to rotate about a first axis, and to translate along a second axis different than the first axis, an analytic element positioner having an analytic element holder configured to releasably grip an analytic element, and a specimen transfer device carried by the tool head, wherein the tool head is configured to automatically position a working end of the specimen transfer device to obtain a specimen from a sample container held in the sample container holder, and to transfer the obtained specimen to an analytic element held by the analytic element holder, respectively, through one or both of rotation of the tool head about the first axis and translation of the tool head along the second axis.

20 Claims, 17 Drawing Sheets

Related U.S. Application Data continuation of application No. 16/084,955, filed as application No. PCT/US2018/021879 on Mar. 9, 2018, now Pat. No. 10,900,875, which is a continuation of application No. 15/454,819, filed on Mar. 9, 2017, now abandoned.

(51) Int. Cl.
| | | |
|---|---|---|
| *G01N 35/00* | (2006.01) | |
| *G01N 35/10* | (2006.01) | |
| *G01N 35/04* | (2006.01) | |

(52) U.S. Cl.
CPC . *G01N 35/00732* (2013.01); *G01N 35/00871* (2013.01); *G01N 35/0099* (2013.01); *G01N 35/1011* (2013.01); *G01N 2035/00039* (2013.01); *G01N 2035/00138* (2013.01); *G01N 2035/0405* (2013.01); *G01N 2035/0406* (2013.01); *G01N 2035/103* (2013.01); *G01N 2035/1032* (2013.01)

(56) References Cited

U.S. PATENT DOCUMENTS

| | | | |
|---|---|---|---|
| 5,269,918 A | 12/1993 | Lapidus et al. | |
| 5,282,978 A | 2/1994 | Polk, Jr. et al. | |
| 6,060,022 A | 5/2000 | Pang | |
| 6,562,299 B1 | 5/2003 | Ostgaard et al. | |
| 6,572,824 B1 | 6/2003 | Ostgaard et al. | |
| 6,665,060 B1 | 12/2003 | Zahniser et al. | |
| 6,866,820 B1* | 3/2005 | Otto | G01N 35/026 422/65 |
| 7,006,674 B1 | 2/2006 | Zahniser et al. | |
| 7,083,106 B2 | 8/2006 | Albany | |
| 7,556,777 B2 | 7/2009 | Victor | |
| 7,579,190 B2 | 8/2009 | Ostgaard et al. | |
| 7,587,078 B2 | 9/2009 | Zahniser et al. | |
| 7,590,492 B2 | 9/2009 | Zahniser et al. | |
| 7,674,434 B2 | 3/2010 | Sakal et al. | |
| 7,771,662 B2 | 8/2010 | Pressman et al. | |
| 8,030,080 B2 | 10/2011 | Spence et al. | |
| 8,119,399 B2 | 2/2012 | Duhamel et al. | |
| 8,137,289 B2 | 3/2012 | Watts et al. | |
| 8,137,642 B2 | 3/2012 | Hutchins et al. | |
| 8,216,512 B2* | 7/2012 | Winther | G01N 1/30 422/65 |
| 8,857,295 B2 | 10/2014 | Tsujimura | |
| 9,335,336 B2 | 5/2016 | Silbert et al. | |
| 9,340,312 B2 | 5/2016 | Clarke | |
| 9,395,379 B2 | 7/2016 | Kappelhoff | |
| 9,670,044 B2 | 6/2017 | Weber | |
| 9,724,948 B2 | 8/2017 | Silbert et al. | |
| 9,732,374 B2 | 8/2017 | Buse et al. | |
| 9,910,054 B2 | 3/2018 | Johns | |
| 10,343,796 B2 | 7/2019 | Itoh | |
| 10,684,301 B2 | 6/2020 | Giovanoli | |
| 2003/0215362 A1* | 11/2003 | Sato | G01N 35/04 422/63 |
| 2004/0022680 A1* | 2/2004 | Gueller | G01N 35/0099 422/62 |
| 2005/0042138 A1* | 2/2005 | Ueda | B01L 3/50825 422/63 |
| 2005/0100483 A1 | 5/2005 | Guiney | |
| 2006/0062692 A1* | 3/2006 | Tokieda | G01N 35/0092 422/64 |
| 2007/0148041 A1 | 6/2007 | Hunt et al. | |
| 2008/0060719 A1* | 3/2008 | Massaro | G01N 35/0099 141/237 |
| 2008/0121050 A1 | 5/2008 | Sakal et al. | |
| 2008/0145887 A1 | 6/2008 | MacIndoe | |
| 2008/0240994 A1* | 10/2008 | Shohmi | G01N 35/10 422/400 |
| 2009/0016931 A1* | 1/2009 | Seino | G01N 35/10 422/63 |
| 2009/0275076 A1 | 11/2009 | Knesel et al. | |
| 2011/0286886 A1 | 11/2011 | Luchinger | |
| 2013/0017127 A1* | 1/2013 | Tokumaru | B01L 9/54 422/509 |
| 2013/0065797 A1* | 3/2013 | Silbert | G01N 1/31 73/304 C |
| 2013/0288344 A1* | 10/2013 | Bargh | C12M 41/22 435/286.1 |
| 2014/0212344 A1 | 7/2014 | Nagaoka et al. | |
| 2014/0224382 A1* | 8/2014 | Nuotio | B67B 7/00 141/98 |
| 2015/0300931 A1* | 10/2015 | Dockrill | G01N 35/0099 435/309.1 |
| 2016/0332156 A1* | 11/2016 | Tajima | B01L 3/0275 |
| 2017/0052205 A1 | 2/2017 | Silbert | |
| 2018/0284146 A1* | 10/2018 | Hansen | G01N 35/00029 |
| 2019/0151841 A1* | 5/2019 | Iwashita | B01L 3/0286 |
| 2020/0023351 A1* | 1/2020 | Muller | B01L 3/502715 |
| 2020/0079542 A1* | 3/2020 | Visinoni | G01N 1/31 |
| 2020/0233001 A1* | 7/2020 | Hashimoto | G01N 35/1011 |
| 2020/0254440 A1* | 8/2020 | Hintikka | B01L 3/0279 |

FOREIGN PATENT DOCUMENTS

| | | |
|---|---|---|
| CN | 102323118 | 1/2012 |
| CN | 104053997 A | 9/2014 |
| CN | 105188938 A | 12/2015 |
| JP | H6-207892 A | 7/1994 |
| JP | 2011-242396 | 12/2011 |
| WO | 2006075201 A1 | 7/2006 |
| WO | WO 2006/075201 | 7/2006 |
| WO | WO 20060075201 | 7/2006 |
| WO | WO 2012/074771 A2 | 6/2012 |
| WO | WO 20120074771 | 6/2012 |
| WO | WO 2013/027747 | 2/2013 |

OTHER PUBLICATIONS

Foreign OA for KR Patent Appln. No. 10-2022-7040071 dated Jun. 19, 2023 (with English translation).
Foreign OA for KR Patent Appln. No. 10-2022-7040068 dated Jun. 19, 2023 (with English translation).
Foreign Exam Report for EP Patent Appln. No. 18714905.9 dated Dec. 15, 2023.
Foreign OA for KR Patent Appln. No. 10-2022-7040068 dated Dec. 20, 2023 (with English translation).
Foreign OA for KR Patent Appln. No. 10-2022-7040071 dated Dec. 20, 2023 (with English translation).
Foreign Search Report for CN Patent Appln. No. 201880016720.3 dated Sep. 29, 2021 (with English Translation).
Foreign Office Action for CN Patent Appln. No. 201880016720.3 dated Oct. 11, 2021 (with English Translation).
International Search Report and Written Opinion for PCT/US2018/021879 mailed Jul. 12, 2018, Applicant Hologic, Inc. (16 pages).
PCT International Preliminary Report on Patentability (Chapter I of the Patent Cooperation Treaty) for PCT/US2018/021879, mailed Sep. 19, 2019, Applicant Hologic, Inc. (11 pages).
Communication pursuant to Rules 161(1) and 162 EPC dated Mar. 19, 2019 in European Patent Application No. 18714905.9 (3 pages), Applicant Hologic, Inc.
Reply to Communication pursuant to Rules 161(1) and 162 EPC dated Oct. 19, 2019 in European Patent Application No. 18714905.9 (95 pages), Applicant Hologic, Inc.
Foreign Exam Report for EP Patent Appln. No. 18714905.9 dated Feb. 11, 2022.
Foreign OA for JP Patent Appln. No. 2021-134636 dated Aug. 29, 2022 (with English translation).
Foreign OA for JP Patent Appln. No. 2023-061112 dated Jan. 18, 2024 (with English translation).
Foreign Exam Report for AU Patent Appln. No. 2022218618 dated Jul. 19, 2023.
Foreign OA for KR Patent Appln. No. 10-2022-7028531 dated Nov. 23, 2023 (with English translation).

(56) References Cited

OTHER PUBLICATIONS

Non-Final Office Action for U.S. Appl. No. 18/056,659 dated Dec. 10, 2024.
CNIPA First Office Action, Chinese Application No. 202210704627, Feb. 13, 2025.
CNIPA First Search Report, Chinese Application No. 202210704627, Feb. 11, 2025.

* cited by examiner

SYSTEMS FOR AUTOMATED PREPARATION OF BIOLOGICAL SPECIMENS

RELATED APPLICATIONS DATA

The present application is a continuation of U.S. patent application Ser. No. 17/133,690, filed Dec. 24, 2020, now U.S. Pat. No. 11,536,634, which is a continuation of U.S. patent application Ser. No. 16/084,955, filed Sep. 13, 2018, now U.S. Pat. No. 10,900,875, which is a National Phase entry under 35 U.S.C § 371 of International Patent Application No. PCT/US2018/021879, filed Mar. 9, 2018, which claims priority to U.S. patent application Ser. No. 15/454,819, filed Mar. 9, 2017, the contents of which are incorporated by reference in their entirety into the present application.

FIELD

The present disclosure generally relates to preparation of biological specimens, and more particularly, to automated systems and methods for collecting a biological specimen from a liquid sample container and dispensing the specimen onto an analytic element, such as a specimen slide, as well as automated systems and methods for obtaining an aliquot of the sample for additional testing.

BACKGROUND

Cytology is a branch of biology dealing with the study of the formation, structure, and function of cells. As applied in a laboratory setting, cytologists, cytotechnologists, and other medical professionals make medical diagnoses of a patient's condition based on visual examination of a specimen of the patient's cells. A typical cytological technique is a "pap smear" test, in which cells are scraped from a woman's cervix and analyzed in order to detect the presence of abnormal cells, a precursor to the onset of cervical cancer. Cytological techniques are also used to detect abnormal cells and disease in other parts of the human body.

Cytological techniques are widely employed because collection of cell samples for analysis is generally less invasive than traditional surgical pathological procedures such as biopsies, whereby a solid tissue specimen is excised from the patient using specialized biopsy needles having spring loaded translatable stylets, fixed cannulae, and the like. Cell samples may be obtained from the patient by a variety of techniques including, for example, by scraping or swabbing an area, or by using a needle to aspirate body liquids from the chest cavity, bladder, spinal canal, or other appropriate area. The acquired cell sample is typically placed in a preservative solution and subsequently extracted from the solution and transferred to a glass slide. A fixative is applied to the cell sample to ensure the cells remain in place on the glass slide for facilitating subsequent staining and examination.

It is generally desirable that the cells on the slide have a proper spatial distribution, so that individual cells can be examined. A single layer of cells is typically preferred. Accordingly, preparing a specimen from a liquid sample containing many cells (e.g., tens of thousands) typically requires that the cells first be separated from each other by mechanical dispersion, liquidic shear, or other techniques so that a thin, monolayer of cells can be collected and deposited on the slide. In this manner, the cytotechnologist can more readily discern the presence of any abnormal cells in the patient sample. The cells are also able to be counted to ensure that an adequate number of cells have been evaluated.

Certain methods and apparatus for generating a thin monolayer of cells and from a liquid sample container and then transferring this thin layer to a "specimen slide" that is advantageous for visual examination are disclosed in U.S. Pat. Nos. 5,143,627, 5,240,606, 5,269,918, 5,282,978, 6,562,299, 6,572,824 and 7,579,190, the disclosures of which are incorporated herein by reference in their entirety. According to one method disclosed in these patents, a patient's cells in a preservative liquid in a sample container are dispersed using a spinning sample collector disposed therein. A controlled vacuum is applied to the sample collector to draw the liquid through a screen filter thereof until a desired quantity and spatial distribution of cells is collected against the filter. Thereafter, the sample collector is removed from the sample container and the filter portion impressed against a glass slide to transfer the collected cells to the slide in substantially the same spatial distribution as collected. Apparatus manufactured according to the teachings of one or more of these patents have been commercially successful, such as the ThinPrep® 2000 Processor (specimen slides processed from patient samples one at a time), and the ThinPrep® 5000 Processor (specimen slides batch processed from patient samples), which are manufactured and sold by Hologic, Inc., located in Marlborough, Massachusetts. Further reference is made to U.S. Pat. Nos. 7,556,777, and 7,771,662, the disclosures of which are incorporated herein by reference in their entirety.

Once a specimen slide has been prepared, the specimen may be visually inspected by a cytotechnologist, typically under magnification, and with or without various sources of illumination. Additionally, or alternatively, automated slide imaging systems are used to aid in the cytological inspection process. For example, an automated slide imaging system may capture an image of all, or substantially all, of the cells captured on the slide, and perform a preliminary assessment of the cells using image processing techniques in order to direct the cytotechnologist to potentially the most relevant cells on the slide for close inspection. Examples of such imaging systems are disclosed in U.S. Pat. Nos. 7,587,078, 6,665,060, 7,006,674 and 7,590,492, the disclosures of which are incorporated herein by reference in their entirety. Whether by inspection of the actual specimen slide under magnification, or of magnified images of the specimen, the specimen is typically classified by the cytotechnologist as either "normal" or "abnormal," wherein an abnormal sample normally falls in one of the major categories defined by The Bethesda System for Reporting Cervical/Vaginal Cytologic Diagnosis, which categories include Low-Grade Squamous Intraepithelial Lesions (LSIL), High-Grade Squamous Intraepithelial Lesions (HSIL), Squamous Cell Carcinoma, Adenocarcinoma, Atypical Glandular cells of Undetermined Significance (AGUS), Adenocarcinoma in situ (AIS), and Atypical Squamous Cell (ASC). Additional information regarding cell specimen classifications is widely available.

It may be desirable to perform other types of diagnostic testing of the same patient sample, such as for Human Papilloma Virus (HPV). Based on the strong correlation between HPV and cervical cancer, it has been recommended that HPV DNA testing be used as a triage test for patients whose Pap smear results are classified as ASC-US. In the case where a liquid-based Pap smear has been performed, the same sample used to perform the Pap smear analysis can be conveniently used to perform a "reflexive" HPV DNA test, thereby obviating the need for a repeat clinic visit and second Pap smear. For example, if a specimen is classified as positive for ASC-US, an "aliquot" (e.g., 4 mL) of the liquid sample may be removed from the stored vial and sent to a molecular diagnostic laboratory for HPV DNA testing.

Significantly, laboratories that perform HPV DNA tests are weary of molecular contamination, a well-known problem in molecular diagnostic laboratories. Thus, due to the risk of cross-contamination, molecular diagnostic laboratories may not accept aliquots that have been taken from an already processed liquid-based Pap smear for fear of unnecessarily generating false HPV positives. As such, it is desirable to obtain and store an aliquot of each patient sample prior to the specimen slide making process in order to preserve a portion of the sample without exposure to cross-contamination. By way of example, certain methods and apparatus for obtaining an aliquot of a patient sample prior to the specimen slide making process are disclosed in U.S. Pat. Nos. 7,674,434, and 8,137,289, the disclosures of which are incorporated herein by reference in their entirety. Additional examples of obtaining sample aliquots in general but not necessarily in conjunction with making specimen slides are disclosed in U.S. Pat. No. 9,335,336 and U.S. Pat. Publ. No. 2017/0052205, the disclosures of which are incorporated herein by reference in their entirety.

Besides being used for HPV DNA testing, aliquots from liquid-based Pap smear samples can also be used DNA testing for other sexually transmitted diseases, such as *Chlamydia trachomatis* and *Neisseria gonorrhoeae*. However, false positives are a special problem when testing for *Chlamydia trachomatis* and *Neisseria gonorrhoeae*, because they could have enormous family and social repercussions. Thus, molecular diagnostic laboratories are even more reluctant to accept aliquots from already processed liquid-based Pap smear samples. Testing for other sexually transmitted diseases need not be used only to triage ASC-US specimens. Indeed, such testing is intended to be performed in parallel to the Pap smear tests at the request of the physician, aliquots may be taken from the Pap smear samples prior to processing, e.g., by manually pipetting the aliquot from the vial, thereby minimizing the risk of cross-contamination. However, this step may still not satisfy the strict contamination prevention requirements imposed by molecular diagnostic laboratories.

In addition to contamination issues, the pipetting of an aliquot from a liquid-based Pap smear sample, whether done before or after the sample is processed, and whether done for HPV testing or testing of any other sexually transmitted disease, increases cost in the form of manual labor which involves not only pipetting the aliquot into an extra vial, but also labeling the vial.

There thus is a need to provide improved apparatus and methods for obtaining an aliquot from a liquid-based biological sample, such as a Pap smear sample while minimizing the risk of cross-contamination.

SUMMARY

Embodiments of the present disclosure are directed to improved automated systems and methods for processing a sample (such as a biological sample) contained in a sample container.

In one embodiment, an automated system for processing a sample contained in a liquid sample container includes a sample container holder configured for holding a sample container and an automated tool head configured to rotate about a first axis, and to translate along a second axis different than the first axis, the system further including a specimen transfer device carried by the tool head, wherein the tool head is configured to automatically position a working end of the specimen transfer device to obtain a specimen from a sample container held in the sample container holder, and then to transfer the obtained specimen to an analytic element (e.g., a slide) held in an analytic element holder, respectively, through one or both of rotation of the tool head about the first axis and translation of the tool head along the second axis. Without limitation, the working end of the specimen transfer device may be configured to receive a filter thereon, the filter comprising a tubular body that forms a seal with the working end portion of the specimen transfer device and a porous membrane end portion that is configured to allow liquid to pass therethrough while retaining cellular matter on an outer surface thereof.

The system may further include an analytic element positioner including the analytic element holder, wherein the analytic element holder is configured to releasably grip the analytic element. The analytic element positioner may be configured to automatically place an analytic element carried by the analytic element positioner into a fixative container held in the fixative container holder after a specimen has been transferred onto the analytic element. The system may include an analytic element (e.g., slide) loading platform located on a surface of the tool head, wherein the analytic element positioner operatively cooperates with the tool head so that the analytic element holder automatically engages and removes an analytic element placed on the loading platform, and wherein the analytic element positioner operatively cooperates with the tool head to automatically position an engaged analytic element proximate the working end of the specimen transfer device to transfer the specimen onto the engaged analytic element.

The system may further include a sample container capping device disposed on the tool head and configured to controllably grip and release a cap of a sample container held in the sample container holder, wherein the tool head is configured to automatically position the sample container capping device proximate the sample container cap through one or both of rotation of the tool head about the first axis and translation of the tool head along the second axis, and wherein the sample container capping device operatively cooperates with the sample container holder to remove or install the sample container cap. Without limitation, the sample container holder may be configured to automatically rotate in one of a clockwise rotational direction and a counter-clockwise rotational direction while the sample container capping device engages the sample container cap in order to remove the sample container cap from the sample container, and wherein the sample container holder is configured to automatically rotate in the other one of the clockwise rotational direction and the counter-clockwise rotational direction while the sample container capping device engages the sample container cap in order to install the sample container cap onto the sample container.

The system may further include a pipette tip dispenser and a pipettor carried by the tool head, the pipettor having a pipette tip engaging member configured to releasably engage pipette tips, wherein the tool head is configured to automatically position the pipette tip engaging member proximate the pipette tip dispenser to allow the pipette tip engaging member to engage a pipette tip held by the pipette tip dispenser through one or both of rotation of the tool head about the first axis and translation of the tool head along the second axis. Without limitation, the pipette tip dispenser may be mounted on a pipette tip dispenser transporter configured to translate the pipette tip dispenser relative to the tool head so that the pipette tip dispenser may be selectively translated to a location at which the tool head positions the pipette tip engaging member to engage a pipette tip from the pipette tip dispenser. The system may further include a pipette tip dispenser isolation chamber, wherein the pipette tip dispenser transporter is configured to selectively translate the pipette tip dispenser between the location at which the tool head positions the pipette tip engaging member to engage a pipette tip from the pipette tip dispenser and a second location within the isolation chamber. A pipette tip waste bin may be mounted on the pipette tip dispenser transporter, wherein the pipette tip dispenser transporter is configured to selectively translate the pipette tip waste bin to a location at which the tool head positions the pipette tip engaging member to disengage a pipette tip into the pipette tip waste bin. For example, the pipette tip waste bin may be mounted on the pipette tip transporter relative to the pipette tip dispenser such that, when the pipette tip waste bin is translated to the location at which the tool head positions the pipette tip engaging member to disengage a pipette tip into the pipette tip waste bin, the pipette tip dispenser is simultaneously translated into the isolation chamber.

In embodiments including the pipettor, the system may further include a supplemental container holder configured for holding a supplemental container, wherein the tool head is configured to automatically position the pipette tip engaging member into a position in which a pipette tip engaged on the pipette tip engaging member is inserted into a sample container held in the sample container holder, and into a position in which the engaged pipette tip is inserted into a supplemental container held in the supplemental container holder, respectively, through one or both of rotation of the tool head about the first axis and translation of the tool head along the second axis. The supplemental container may be an aliquot container, wherein when the tool head and pipettor operatively cooperate to automatically cause the pipette tip engaging member to engage a pipette tip from the pipette tip dispenser, draw an aliquot of a sample from a sample container held in the sample container holder using the engaged pipette tip, and dispense the obtained sample aliquot into the aliquot container, respectively. Alternatively, and without limitation, the supplemental container may be a reagent container containing a reagent, and wherein when the tool head and pipettor operatively cooperate to automatically cause the pipette tip engaging member to engage a pipette tip from the pipette tip dispenser, draw an aliquot of reagent from the reagent container using the engaged pipette tip, and dispense the reagent aliquot into a sample container held in the sample container holder, respectively.

A supplemental container capping device may be disposed on the tool head and configured to controllably grip and release a cap of a supplemental container held in the supplemental container holder, wherein the tool head is configured to automatically position the supplement container capping device proximate the supplemental container cap through one or both of rotation of the tool head about the first axis and translation of the tool head along the second axis, and wherein the supplement container capping device operatively cooperates with the supplemental container holder to remove or install the supplemental container cap. For example, the supplemental container holder may be configured to automatically rotate in one of a clockwise rotational direction and a counter-clockwise rotational direction while the supplement container capping device engages the supplemental container cap in order to remove the supplemental container cap from the supplemental container, and wherein the supplemental container holder is configured to automatically rotate in the other one of the clockwise rotational direction and the counter-clockwise rotational direction while the supplement container capping device engages the supplemental container cap in order to install the supplemental container cap onto the supplemental container. In some embodiments including both a sample container capping device and a supplemental container capping device, the two capping devices may be offset from one another on the tool head such that, when the sample container capping device is in a position to grip and remove the sample container cap, the supplemental container capping device is in a position to grip and remove the supplemental container cap without further rotational movement of the head tool.

The system may further include an analytic element (e.g., slide) loading platform located on a surface of the tool head, wherein the analytic element positioner operatively cooperates with the tool head so that the analytic element holder automatically engages and removes an analytic element placed on the loading platform, and wherein the analytic element positioner operatively cooperates with the tool head to automatically position an engaged analytic element proximate the working end of the specimen transfer device to transfer the specimen onto the engaged analytic element.

The system may further include a reader (e.g., a bar code reader or scanner) positioned on the tool head and configured for reading sample container indicia located any of a sample container. An analytic element printer may be provided in communication with reader and configured for printing analytic element indicia corresponding to sample container indicia read by the reader onto an analytic element, which may be, without limitation, a slide.

An aliquot container printer may also be provided in communication with the reader and configured for printing analytic element indicia corresponding to sample container indicia read by the reader onto an aliquot container. In various embodiments, the reader is further configured to read indicia on other system components and consumables, such as on a slide or on a filter used for obtaining a sample specimen.

Embodiments of the system may include a controller for controlling operation of one or more of the tool head, pipettor, capping devices, and analytic element positioner, as well as a user interface operatively coupled with the controller and configured for displaying system status and/or inquiries to a system operator, and for receiving user inputs in response to the displayed system status and/or inquiries.

In one embodiment, an automated system for processing a sample contained in a liquid sample container includes a sample container holder configured for holding a sample container, an automated tool head configured to rotate about a first axis, and to translate along a second axis different than the first axis, a pipette tip dispenser, a pipettor carried by the tool head, the pipettor having a pipette tip engaging member configured to releasably engage pipette tips, wherein the tool head is configured to automatically position the pipette tip engaging member proximate the pipette tip dispenser to allow the pipette tip engaging member to engage a pipette tip held by the pipette tip dispenser through one or both of rotation of the tool head about the first axis and translation of the tool head along the second axis, wherein the pipette tip dispenser is mounted on a pipette tip dispenser transporter configured to translate the pipette tip dispenser relative to the tool head so that the pipette tip dispenser may be selectively translated to a location at which the tool head positions the pipette tip engaging member to engage a pipette tip from the pipette tip dispenser; and a pipette tip dispenser isolation chamber, wherein the pipette tip dispenser transporter is configured to selectively translate the pipette tip dispenser between the location at which the tool head positions the pipette tip engaging member to engage a pipette tip from the pipette tip dispenser and a second location within the isolation chamber.

In yet another embodiment, an automated system for processing a sample contained in a liquid sample container includes sample container holder configured for holding a sample container, an automated tool head configured to rotate about a first axis, and to translate along a second axis different than the first axis, a pipette tip dispenser, a pipettor carried by the tool head, the pipettor having a pipette tip engaging member configured to releasably engage pipette tips, wherein the tool head is configured to automatically position the pipette tip engaging member proximate the pipette tip dispenser to allow the pipette tip engaging member to engage a pipette tip held by the pipette tip dispenser through one or both of rotation of the tool head about the first axis and translation of the tool head along the second axis, and a supplemental container holder configured for holding a supplemental container, wherein the tool head is configured to automatically position the pipette tip engaging member into a position in which an engaged pipette tip is inserted into a sample container held in the sample container holder, and into a position in which an engaged pipette tip is inserted into a supplemental container held in the supplemental container holder, respectively, through one or both of rotation of the tool head about the first axis and translation of the tool head along the second axis. Without limitation, the supplemental container may be one of a reagent container and an aliquot container.

In still another embodiment, a system for processing a sample contained in a liquid sample container includes a sample container holder configured for holding a sample container, a supplemental container holder configured for holding a supplement container, an automated tool head configured to rotate about a first axis, and to translate along a second axis different than the first axis, a first capping device disposed on the tool head and configured to controllably grip and release a cap of a sample container held in the sample container holder, wherein the tool head is configured to automatically position the first capping device proximate the sample container cap through one or both of rotation of the tool head about the first axis and translation of the tool head along the second axis, and wherein the first capping device operatively cooperates with the sample container holder to remove or install the sample container cap, and a second capping device disposed on the tool head and configured to controllably grip and release a cap of a supplemental container held in the supplemental container holder, wherein the tool head is configured to automatically position the second capping device proximate the supplemental container cap through one or both of rotation of the tool head about the first axis and translation of the tool head along the second axis, and wherein the second capping device operatively cooperates with the supplemental container holder to remove or install the supplemental container cap. The sample container holder may be configured to automatically rotate in one of a clockwise rotational direction and a counter-clockwise rotational direction while the first capping device engages the sample container cap in order to remove the sample container cap from the sample container, and wherein the sample container holder is configured to automatically rotate in the other one of the clockwise rotational direction and the counter-clockwise rotational direction while the second capping device engages the sample container cap in order to install the sample container cap onto the sample container. The supplemental container holder is configured to automatically rotate in one of a clockwise rotational direction and a counter-clockwise rotational direction while the second capping device engages the supplemental container cap in order to remove the supplemental container cap from the supplemental container, and wherein the supplemental container holder is configured to automatically rotate in the other one of the clockwise rotational direction and the counter-clockwise rotational direction while the second capping device engages the supplemental container cap in order to install the supplemental container cap onto the supplemental container. The sample capping device and the supplemental capping devices may be offset from one another on the tool head such that, when the sample capping device is in a position to grip and remove the sample container cap, the supplemental capping device is in a position to grip and remove the supplemental container cap without further rotational movement of the head tool. Without limitation, the supplemental container is one of a reagent container and an aliquot container.

Other and further aspects and features of the disclosed embodiments will become apparent in view of the following detailed description to be read in conjunction with the accompanying figures.

BRIEF DESCRIPTION OF THE DRAWINGS

The foregoing and other aspects of embodiments of the present disclosure are described in further detail with reference to the accompanying drawings, wherein like reference numerals refer to like elements and the description for like elements shall be applicable for all described embodiments wherever relevant, and in which.

DETAILED DESCRIPTION

For purposes of illustration, the disclosed systems and methods of use described herein and illustrated in the accompanying figures are directed to the processing of a patient sample to produce a traditional cytological specimen slide, it will be appreciated that alternative embodiments may include the preparation of different types of biological specimens that are presented on differing types of analytic elements (i.e., other than cytological and other than on a slide) are contemplated within the scope of the disclosed embodiments and claims. Moreover, the disclosed systems and methods may be used for processing other types of liquid samples, including non-biological particulates and liquids. Thus, is should be understood that the disclosed and illustrated embodiments are presented for purposes of illustration and not limitation.

As used herein, terms such "specimen", "specimen sample", "biological sample", "cytological specimen", "cell sample" and "biological specimen" may be used interchangeably and should be similarly understood and construed, unless the context of their use requires a more specific meaning. Additionally, terms such as "aliquot" and "aliquot sample" may be used interchangeably and should be similarly understood and construed. For example, and without limitation, the systems and methods disclosed herein may be used to process a biological sample contained in a liquid sample container to produce a specimen or a specimen sample, as well as an aliquot or an aliquot sample. Moreover, the term "aliquot" is not to be construed as limiting, as an "aliquot" is another way of expressing "liquid sample" or a "portion of a liquid sample." In other words, to obtain an aliquot or an aliquot sample of a biological sample means to obtain and store a portion of the original sample in a separate container for subsequent evaluation. Additionally, terms such as "sample container", "liquid sample container", "patient container" "sample vial" and "patient vial", "tube" "supplemental container" and other permutations may be used interchangeably and should be similarly understood and construed, unless the context of their use requires a more specific meaning; for example, based on the stated contents of the container.

As used herein, the terms "automatically" and "automated" mean that a system, apparatus, process and/or function is performed without user (e.g., system operator) intervention, often but not necessarily under the control of a programmed processor. In particular, the automated systems and methods disclosed herein advantageously reduce the number of manual steps required to prepare a biological sample, for example, the prepare a cytological specimen slide and/or to obtain an aliquot of a patient sample for additional testing and/or additional sample processing, such as introducing a reagent into a sample prior to further processing.

Figure 1:
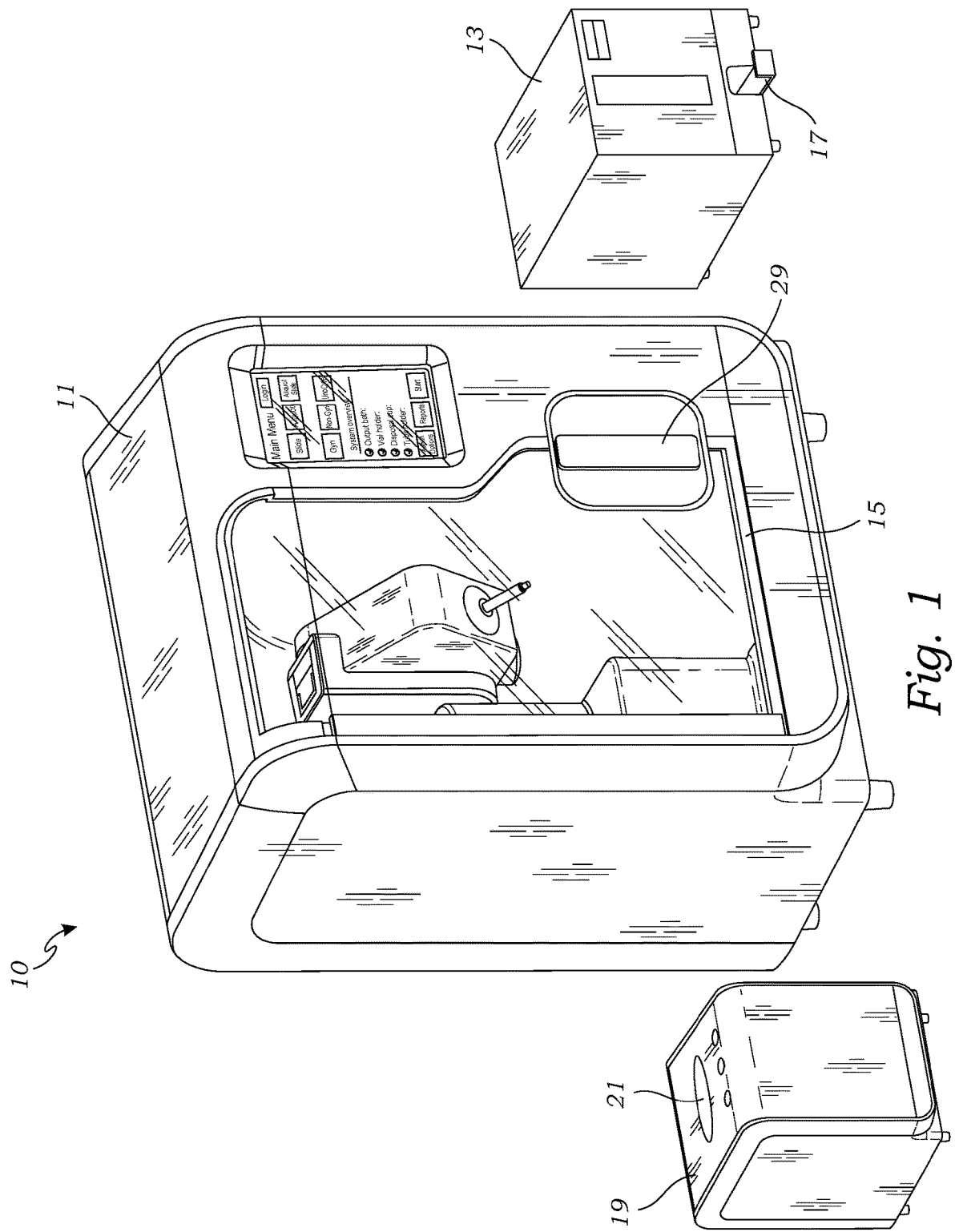
FIG. 1 is a right, front, perspective view of an exemplary automated biological sample processing system, according to one embodiment, including a sample processing cabinet, a slide printer, and an aliquot container printer.

FIG. 1 illustrates an exemplary automated biological sample processing system 10 that may be used for preparing a cytological specimen slide and/or an aliquot sample from a biological sample (e.g., obtained from a pap smear) contained in a liquid sample container. As will be explained in greater detail below, the system 10 may be used for additional types of sample processing, such as (without limitation) for adding a reagent to a biological or other type of sample.

The system 10 generally includes a sample processing cabinet 11, a slide printer 13 and an aliquot tube printer 19. In the illustrated embodiment, the main components of the system 10 are housed in (and/or attached to) a sample processing cabinet 11. As will be further described below, a slide printer 13 and aliquot tube printer 15 are operatively coupled with the sample processing cabinet via known wireless or wired communication connections (not shown) under the control of one or more processors located in the sample processing cabinet 11. For simplicity, the one or more processors are hereinafter referred to collectively as a "system controller 60" (further described below in conjunction with FIG. 17) that controls the automated movements and other operations of the components of the system 10 housed within the sample processing cabinet 11, as well as the communications with the respective slide printer 13 and aliquot vial printer 19. For further ease in describing the system 10, the components of the respective sample processing cabinet 11, slide printer 13 and aliquot tube printer 19 are referred to collectively as "the system" 10, without regard to where the specific components may be housed. It should be appreciated that, in alternate embodiments, the various components of the system 10 may be housed or otherwise provided separately.

By way of examples, and without limitation, the system 10 may be configured to process sample containers, such as the Thin Prep® sample vial, and aliquot containers such as the Aptima® vial, which are both available from Hologic, Inc., Marlborough, Mass. (www.hologic.com).

The sample processing cabinet 11 is preferably an environmentally enclosed housing (or "skin") in order to reduce possible contamination introduced from the surrounding environment. In the illustrated embodiment, the sample processing cabinet 11 is provided with an openable front door 15 to provide access to the system components therein. The door 15 is hinged such that it swings open and closed and is provided with a handle 29. In alternative embodiments, the door 15 may be a sliding door, e.g., which slides laterally to open and close. In the illustrated embodiment, the front door 15 has a transparent or semi-transparent panel so that the system components housed in the sample processing cabinet 11 are visible with the front door 15 in the closed position, although this is not a requirement for practicing the disclosed embodiments. With brief reference also to FIG. 16, a stabilizing foot 79 that may be made of a material to minimize vibrational movement of the cabinet may be provided at each of the four corners of the bottom, wherein the cabinet would typically rest on the four feet on a table top in a laboratory. The feet 79 are preferably sized and configured to allow for some clearance from the table surface, in addition to providing better stability.

The slide printer 13 may be any commercially available slide printer, such as the Signature Slide Printer available from Primera, Technology, Inc., located in Plymouth, Minn. (https://www.primera.com/signature-slide-printer). The slide printer 13 is loaded with new slides, and outputs printed slides through an output slot 17 that is be used for receiving a cytological specimen thereon as part of the processing of a respective patient sample container. In particular, the printer 13 prints indicia (e.g., a bar code) onto a portion of the slide that is to the side of where the cytological specimen is applied, wherein the printed indicia on the slide that matches or otherwise corresponds to indicia read on the sample container being processed, as explained in further detail below.

The aliquot container printer 19 is preferably the same as taught in U.S. Pat. No. 9,724,948 (the '948 patent), the disclosure of which is incorporated herein by reference in its entirety. As explained by the '948 patent, the aliquot container printer 19 is provided with an opening 21 into which a new (unprinted) aliquot is inserted. The printer 19 prints indicia (e.g., a bar code) on the aliquot container that matches or otherwise corresponds to the indicia read on the sample container being processed, as explained in further detail below. The printed container is then ejected out of, or otherwise available for retrieval from, the opening 21.

Figure 2:
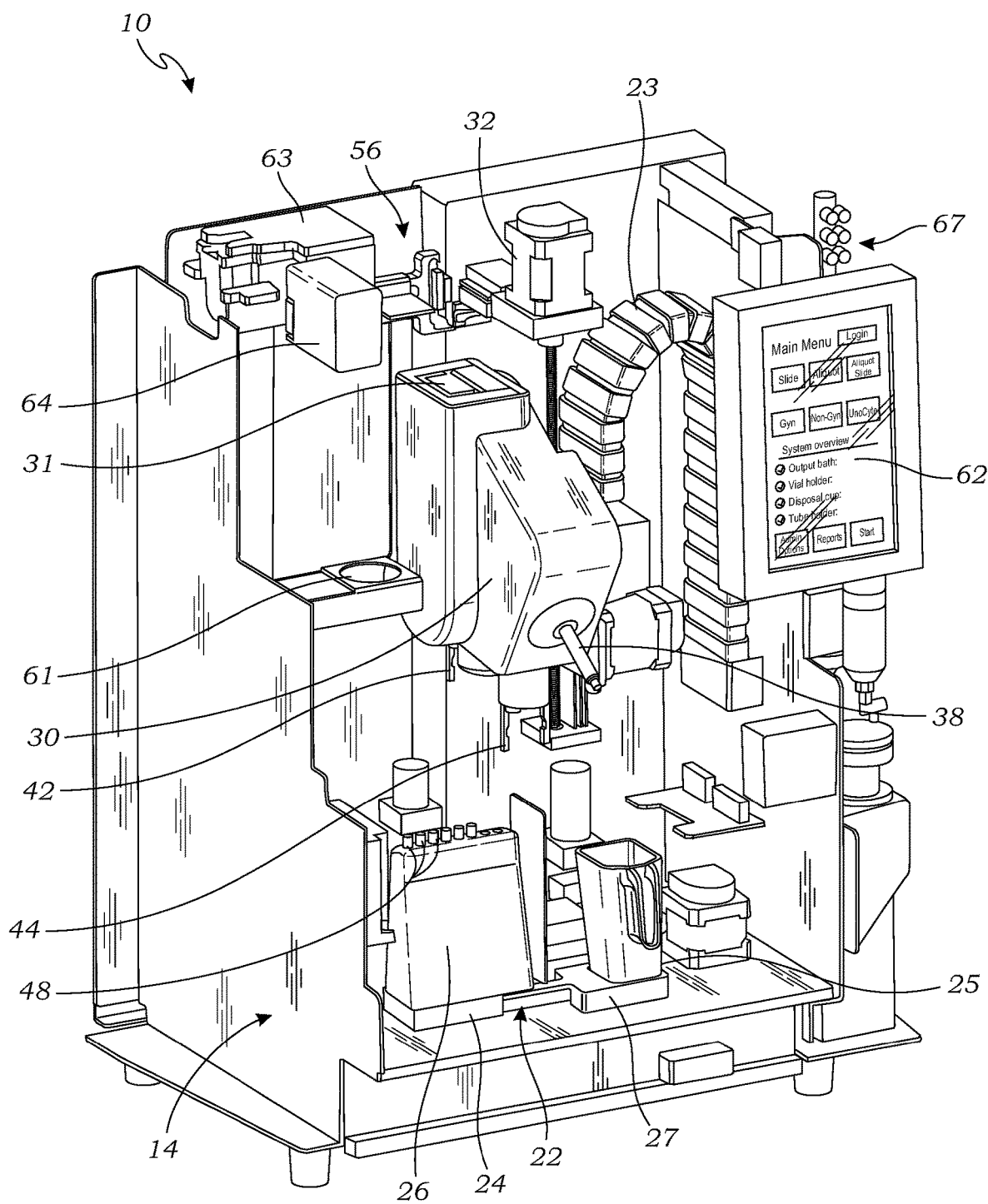
FIG. 2 is a right, front, perspective view of the sample processing cabinet of FIG. 1, wherein the exterior cabinet walls are not shown in order to better show the system components located therein.
Figure 3:
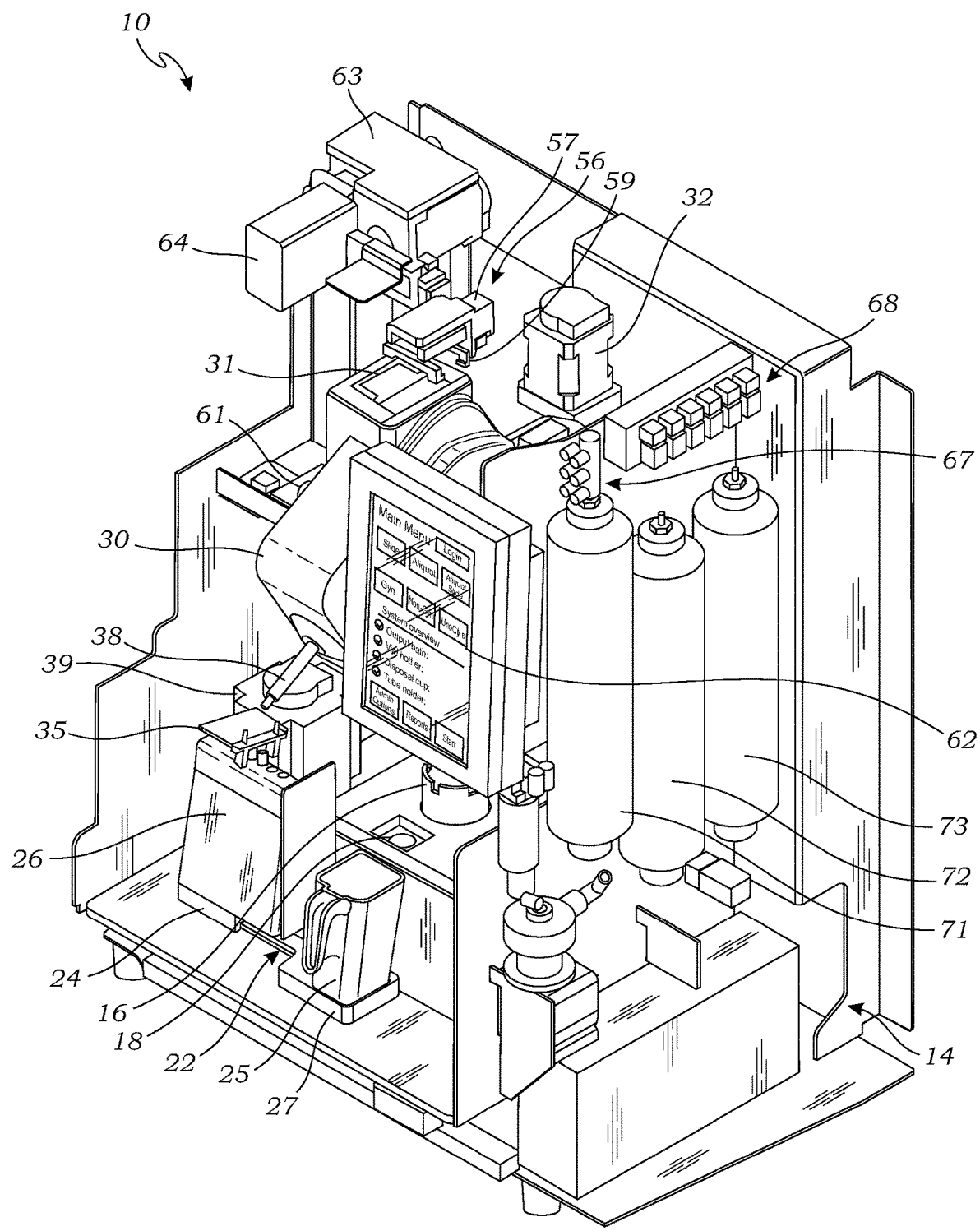
FIG. 3 is a left, front, perspective view of the sample processing cabinet of FIG. 1, wherein the exterior, and some interior, walls and/or partitions are not shown in order to better show the system components located therein.

FIGS. 2 and 3 depict the components of the system 10 that are housed within or otherwise attached to the sample processing cabinet 11, wherein the cabinet housing walls are removed for ease in illustration. The cabinet 11 comprises a chassis 14 which may include a plurality of floors, walls, and/or supports that provide a primary support structure to which the various system components are installed/mounted.

As best seen in FIG. 3, a cylindrical sample container holder 16 is disposed in a lower central portion of the chassis 14. As will be described in greater detail below, the sample container holder 16 is fixedly mounted on a rotating platform configured to rotate a sample container 12 (shown in FIG. 4) held in the sample container holder 16 about a center z-axis of the container 12 for mixing the sample for achieving a substantially uniform dispersion of the cellular or other particular material contained in the sample container 12 prior to initiation of the processing thereof, and also to facilitate the uncapping and re-capping of the container 12 during the processing. In the illustrated embodiment, the sample container holder 16 is a cylindrical receptacle configured to snuggly receive and hold the sample container 12. The sample container holder 16 has an outer wall that extends to a height less than the height of the sample container 12 such that a cap 43 on a sample container held in the sample container holder 16 is completely exposed. In order to facilitate the respective mixing, uncapping and capping thereof. In alternate embodiments, the sample container holder 16 may be any suitable shape for receiving the particular sample container being utilized with the system 10, such as a rectangular box or other shape.

As also best seen in FIG. 3, an aliquot container holder 18 is disposed in a lower central portion of the chassis 14 directly in front of the sample container holder 16. As will be described in greater detail below, the aliquot container holder 18 is fixedly mounted on a rotating platform configured to rotate an aliquot container 20 (shown in FIG. 5) held in the aliquot container holder 18 about a center z-axis of the container 20 to facilitate the uncapping and re-capping of the container 20 during the sample processing. The aliquot container holder 18 is configured to snuggly receive and hold the aliquot container 20 and has an outer wall that extends to a height less than the height of the aliquot container 20 such that a cap 45 on the aliquot container 20 held in the aliquot container holder 18 is completely exposed in order to facilitate the respective mixing, uncapping and capping thereof. In the illustrated embodiment, the aliquot container holder 18 is sized and configured to hold a more tubular shaped container than that held by the sample container holder 16. In alternate embodiments, the aliquot container holder may be any suitable shape for receiving the particular aliquot container being utilized with the system 10, such as a rectangular box or other shape. As is also described below, the system 10 may be used to for additional sample processing steps, such as for introducing a reagent into the sample container. As such, it should be understood that reference to the aliquot container holder 18 and the aliquot container 20 itself should be understood to be exemplary and not limiting. For example, the term "supplemental container holder" and "supplemental container" may be used interchangeably with aliquot container holder and aliquot container.

More particularly, the sample container holder 16 and aliquot container holder 18 are each mounted on (or otherwise integrally formed with) respective underlying rotatable platforms (not shown) that are rotatably coupled to or near a floor of the chassis 14. The respective rotating platforms, and thus the container holders 16 and 18, may be selectively rotated about a center z-axis of each holder 16 and 18 in a clockwise rotational-direction or a counter-clockwise rotational direction. In particular, and with additional reference to FIG. 16, a sample dispersion drive assembly is provided for performing relatively high-speed mixing of the contents of a sample container 12 held in the sample container holder 16 in order to disperse the cellular and/or other particulate matter suspended within the liquid sample prior to further processing of the sample. The sample dispersion rotational drive assembly includes a sample dispersion motor (not seen) mounted proximate a floor of the chassis 14, the sample dispersion motor having a rotating output shaft that extends through the chassis floor to rotate a drive wheel 81. The drive wheel 81 in turn rotates a larger diameter drive wheel 93 via a drive belt 88. A hi/lo speed clutch 82 is operatively coupled with drive wheel 93 to selectively engage the drive wheel 93 with the respective rotating platform associated with the sample container holder 16 via a rotating drive shaft (not shown) extending back up through the chassis floor, to thereby also rotate the sample container holder 16 for performing relatively high-speed dispersion of the particles contained in a sample container 12 heled therein prior to further processing of the sample.

With continued additional reference to FIG. 15, the system 10 further includes a capping drive assembly for providing simultaneous relatively low-speed rotation of both the sample and aliquot container holders, 16 and 18, for removing and reinstalling respective caps, 43 and 45, on sample and aliquot containers, 12 and 20, held in the respective sample and aliquot container holders, 16 and 18, as is described below in greater detail. The capping drive assembly includes a capper motor 39 (seen in FIG. 3) mounted on or near the floor of the chassis 14 in a lower side compartment 28 of the cabinet 11. The capper motor is reversible in order to provide rotational motion in each of a clockwise direction and counter-clockwise direction. The capper motor 39 has a rotating output shaft that extends through a floor of the chassis 14 to rotate a drive gear 84, which in turn rotates a larger drive gear 91 via a drive belt 85. The hi/lo speed clutch 82 is operatively coupled with the drive gear 91 to thereby selectively engage the drive gear 91 with the rotating platforms associated with the sample container holder 16 and aliquot container holder 18 via a rotating shaft (not shown) that extends from the drive gear 91 back up through the chassis floor. Notably, a further arrangement of one or more drive gears/wheels and belts (not shown) are provided in a lower portion of the chassis, underlying the respective rotating platforms of the sample container holder 16 and aliquot container holder 18 in order to simultaneously distribute the rotational motion of wheel 91 to each of the rotating platforms. In this manner, actuating of the capping motor simultaneously rotates the sample container holder 16 and the aliquot container holder 18 at a relatively low-speed for removing or reinstalling the caps 43 and 45, depending on the rotational direction of the output shaft of the motor 39.

Figure 4:
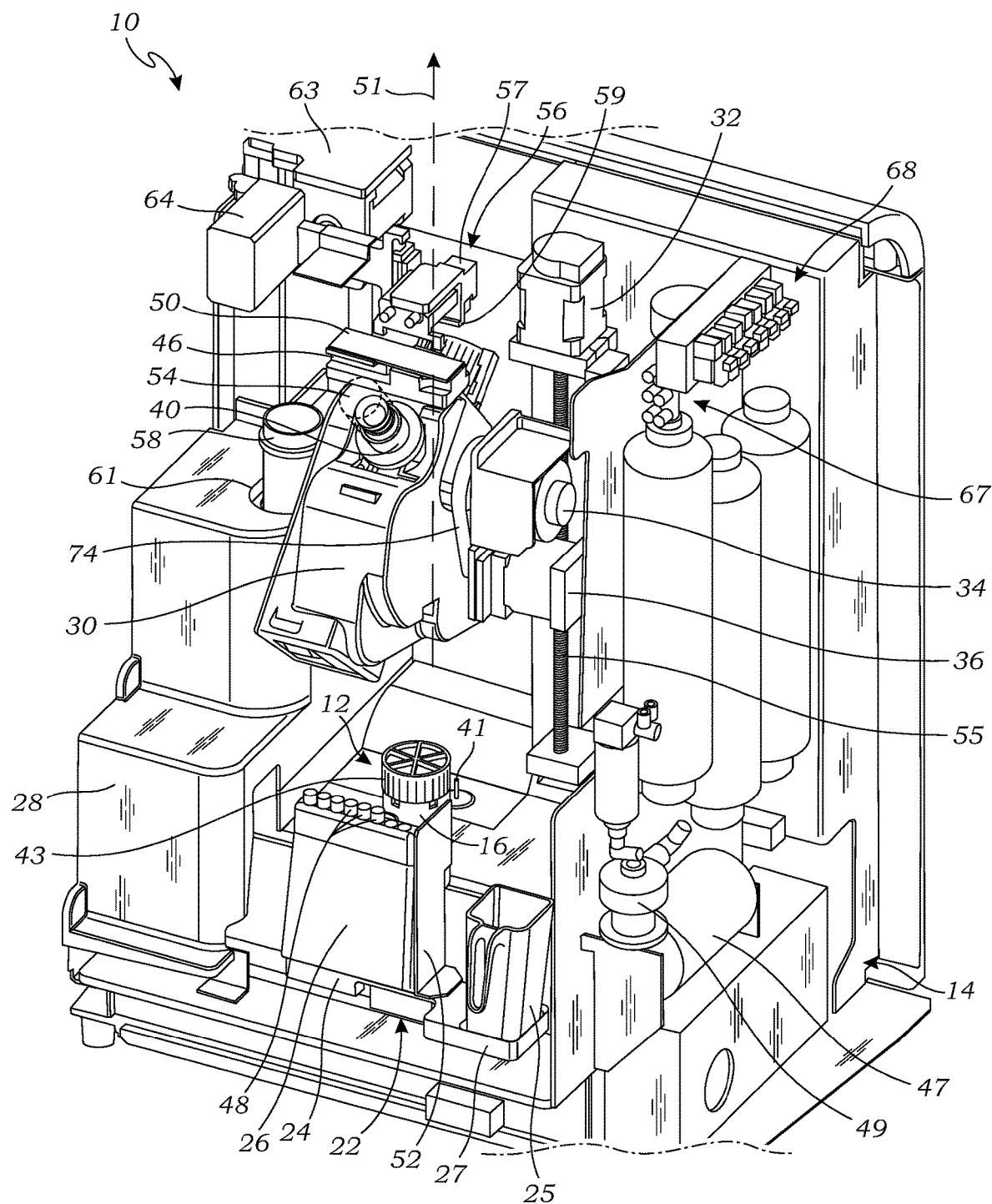
FIGS. 4-14 are respective left, right and front perspective views of the system components of the sample processing cabinet of FIG. 1, illustrating the various movements and operations performed by the system components during a sample processing procedure.
Figure 7:
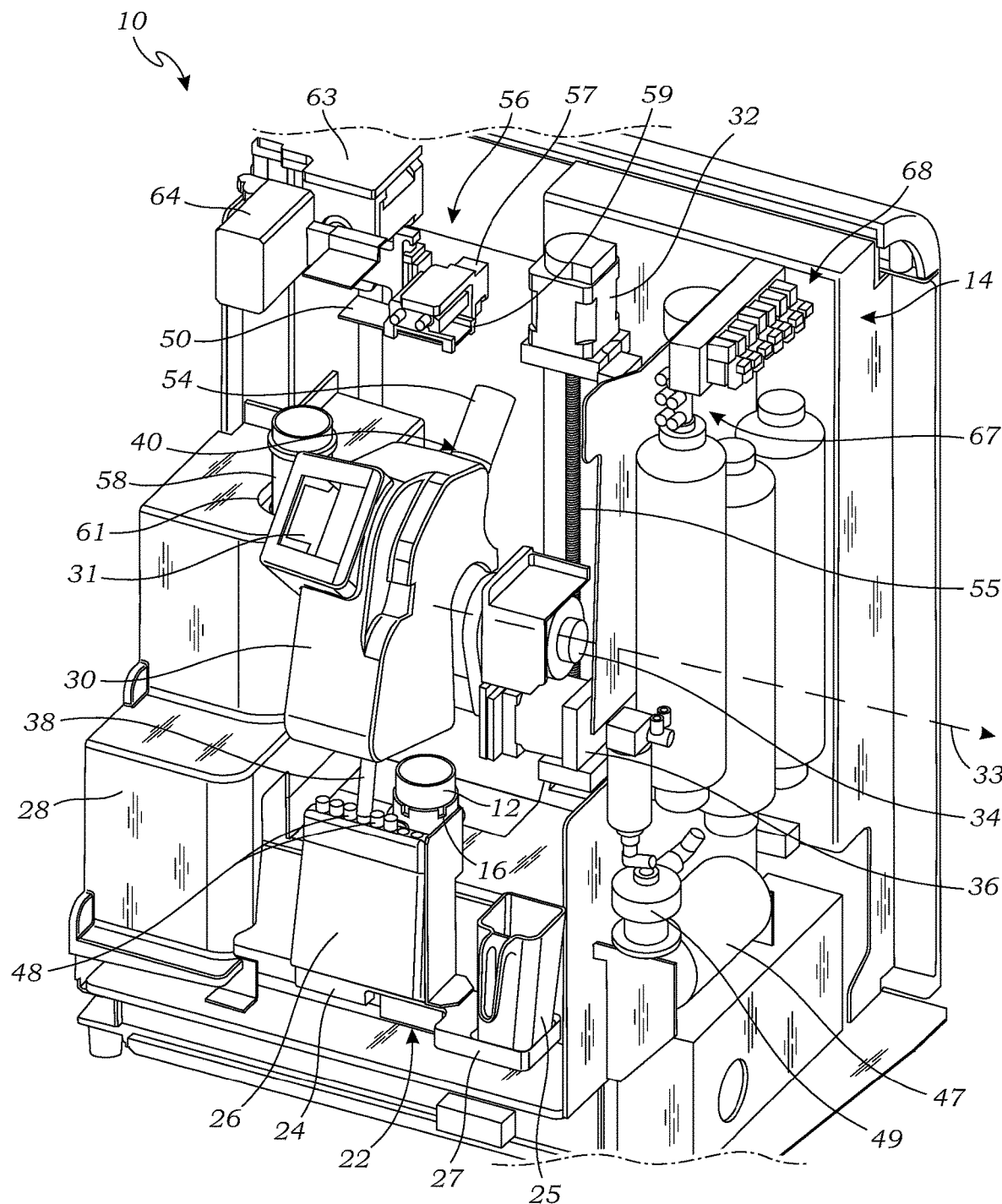

Referring to FIG. 4, the system 10 includes an automated tool head 30 that is rotatably mounted on a load bearing shaft assembly 34, such that the tool head 30 is configured to pivot or rotate back and forth about a rotational axis, indicated by dashed line 33 in FIG. 7. Preferably, the tool head 30 has a range of rotation through an arc of at least 270 degrees about the rotational axis, although no specific minimum amount of rotational travel s is required beyond that necessary to perform the functions of the particular system embodiment. In the illustrated embodiment, the tool head rotates at least 270 degrees about its rotational the axis 33. The load bearing shaft assembly 34 preferably includes spin bearings (not shown) to minimize friction between the tool head 30 and a mounting shaft (not shown) on which the tool head 30. A tool head rotational actuating motor 36 is attached to the load bearing shaft assembly 34, wherein an output shaft (not seen) of the motor 36 is operatively coupled to the shaft in or to rotate the tool head 30 via a drive belt 74. The rotational actuating motor 36 is reversible to selectively provide rotational motion of the tool head 30 in both a clockwise rotational direction and a counter-clockwise rotational direction.

With continued reference to FIG. 4, the motor 36 is housed in a block-type support housing (also referred to as item 36 in the figures), which is threadably mounted on a vertical lead screw 55 (best seen in FIG. 15) disposed in a rear portion of the chassis 14. The lead screw 55 is actuated by a tool head linear actuating motor 32 mounted to a rear wall (near the top) of the chassis 14. The tool head linear actuating motor 32 is reversible to selectively provide rotational motion of the lead screw 55 in both a clockwise rotational direction and a counter-clockwise rotational direction. In particular, rotation of the lead screw 55 in one of the clockwise rotational direction and a counter-clockwise rotational directions causes the motor block 36, and thus the respective load bearing shaft assembly 34 tool head 30, to travel linearly upward relative to the chassis 14 along a vertical (or "z") translational axis indicated by dashed line 51 in FIG. 4, and rotation of the lead screw 55 in the other one of the clockwise rotational direction and a counter-clockwise rotational directions causes the motor block 36, and thus the respective load bearing shaft assembly 34 tool head 30, to travel linearly downward relative to the chassis 14 along the vertical axis 51. With this mechanical arrangement, and as further described below, the automated tool head 30 is configured to selectively controllably rotate in each of a clockwise rotational direction and a counter-clockwise rotational direction about the rotational axis 33, and to independently selectively translate up or down along the vertical axis 51, respectively, including simultaneous rotational and translational motion. Operation of the rotational actuating motor 36 controls the rotational position of the tool head 30 about the rotational axis 33, and operation of the linear actuating motor 32 controls the vertical position of the tool head 30 along the vertical axis 51 within the interior of the cabinet 11.

A number of sample processing devices (or "tools") are disposed circumferentially about the tool head 30, and are arranged so that the respective function accomplished by each of the devices may be accomplished by one or both of one or both of rotation of the tool head about its rotational axis 33 and translation of the tool head 30 along its vertical translation axis 51, without requiring movement of the tool head 30 in an x direction (i.e., sideways relative to the cabinet 11), or a y direction (i.e., back to front relative to the cabinet 11). In the illustrated embodiment, these devices include an indicia reader 31 configured to read an indicia such as a bar code on the sample container 12; a first capping device 42 including pneumatically controlled grippers configured for releasably griping a cap 43 of a sample container 12 being processed; a second capping device 44 including pneumatically controlled grippers configured for releasably griping a cap 45 of a supplemental container 20 (e.g., an aliquot tube or a vessel containing a reagent); a pipettor 37 (best seen in FIG. 15) having a pipette tip engaging member 38 extending outwardly from the tool head 30 and configured for releasably engaging pipette tips; a specimen collection and transfer device (hereinafter "specimen transfer device") 40 having a working end extending outwardly from the tool head 30 and configured for obtaining a specimen sample from the sample container; and a slide loading bed or "platform" 46 configured to receive a slide 50 to be delivered by the tool head 30 to a slide holder 57 of a slide positioner assembly 56 (as described below in greater detail).

Each of devices 31, 42, 44, 37/38, 40 and 46 is located on the tool head 30 a different circumferential and/or angular position and orientation about the rotational axis 33, so as to that each of these devices rotate with the tool head 30 as the tool head is rotated about its rotational axis 33 under control of the rotational actuating motor 34, and are moved vertically up or down within the interior of the cabinet 11 along vertical axis 51 of the tool head under control of the translational actuating motor 32. Thus, the rotational and/or vertical translational actuation of the tool head 30 positions each of these devices at a relative rotational and vertical position within the interior of the cabinet 11 in order to perform their respective functions, as further described herein. It should be appreciated that each of the particular devices or tools provided on the tool head 30 in the illustrated embodiment is not essential, nor limiting. For example, in alternative embodiments, more or less devices/tools may be carried on the tool head 30. For example, only a single capping device (e.g., 42 or 44) may be employed and/or the reader 31 may be provided in a location separate from the tool head 30, including not being within the cabinet 11. By way of further example, the slide loading platform 46 may be omitted in some embodiments, wherein the system operator loads the slides directly into a slide holder such as or similar to slide holder 57. These and other variations and permutations of the provisional of devices/tools on the tool head 30 are also contemplated within the scope of the present disclosure.

As seen in FIGS. 3 and 4, a pump 47 having a pump head 49 supplies pressurized air that is stored in a high-pressure tank 71 that supplies pressurized air for operating various pneumatic devices location in the cabinet 11 via manifold of solenoid valves 68 and connectors 67. A slightly elevated pressure tank 72 and a slightly negative pressure tank 73, respectively, are also provided for operation of the specimen transfer device 40 (described below in greater detail). For clarity, communication pathways of the pressurized air, such as solid and/or flexible tubing lines interconnecting the pump 47 to the tank 71, and the tank 71 to the various pneumatic devices are not shown in order to more clearly view the system components located in the cabinet 11 without being obscured by the tubing. However, a flexible conduit 23 through which various pneumatic tubing and electrical conducts are connected to the tool head 30 and the various devices thereon, such as (without limitation) the cappers 42, 44, pipettor 37 and the specimen transfer device is shown in FIG. 2 (only). Bundling the various tubing and wires through the single conduit 23 reduces the chance of snagging or displacing a tube or wire from a connector by operation of the tool arm 30. Notably, the lengths of the tubing and electrical connections that pass through the conduit 23 are sufficiently long to allow the conduit 23 can to move with the tool head 30 as the tool head 30 translates linearly along its vertical axis 51 and rotates about its rotational axis 33.

Referring back to FIGS. 2 and 3, the reader 31 is configured to read identifying indicia such as (without limitation)

patient identification and/or medical record identifiers, a date on, or medical establishment at, which the sample was obtained, etc., on any of the sample container 12, aliquot container 20, slide 50 and/or filter 54. The reader 31 may be an optical reader or scanner, such as for reading barcodes, QR codes, machine readable alphanumeric text and/or an optical camera that acquires an image of a label that may then be read and/or recognized using optical character recognition (OCR) software, or an electronic reader configured to read an NFC chip, RFID or other electronic tag, or other reader configured to read a readable indicia. Examples of such alternate indicia storage techniques for slides are provided in U.S. Pat. No. 7,083,106 and U.S. Pat. Publ. No. 20070148041, the disclosures of which are incorporated herein by reference in their entirety.

In the illustrated embodiment, the reader 31 is configured among other capabilities to read indicia in form of a bar code. Indicia on the sample container 12 is read by the reader 31 and transmitted via the system controller 60 (described below in further detail) to each of the slide printer 13 and the aliquot container printer 19 for printing a matching or otherwise corresponding indicia on a respective slide 50 and/or aliquot container 20 to be used in a sample processing procedure.

With reference (primarily) to FIGS. 2-5, a pipette tip dispenser gantry or "transporter" 22 is coupled to the chassis 14 forward of the aliquot container holder 18. The pipette tip dispenser transporter 22 includes a pipette tip dispenser holder 24 configured for securely seating a pipette tip dispenser 26 thereon. The pipette tip dispenser is configured for holding a plurality of pipette tips 48, e.g., eight pipette tips in the illustrated embodiment, wherein the dispenser may be supplied as a pipette tip cartridge. The pipette tip dispenser 26 may be removably mounted to the holder 24 in any of a number of ways. In the illustrated embodiment, the pipette tip dispenser 26 is magnetically coupled to the pipette tip dispenser holder 24 in a manner that ensures precise and predictable positioning of the dispenser 26 relative on the holder 24, and which also allows for the system controller 60 (further described below) to confirm through a sensor circuit that the dispenser 26 is properly attached and positioned relative to the holder 24. This is important to ensure that the pipette tip engaging member 38 carried by the tool head 30 can exactly align with, to thereby engage a pipette tip 48 held in a respective slot of the dispenser during a sample processing procedure.

Figure 16:
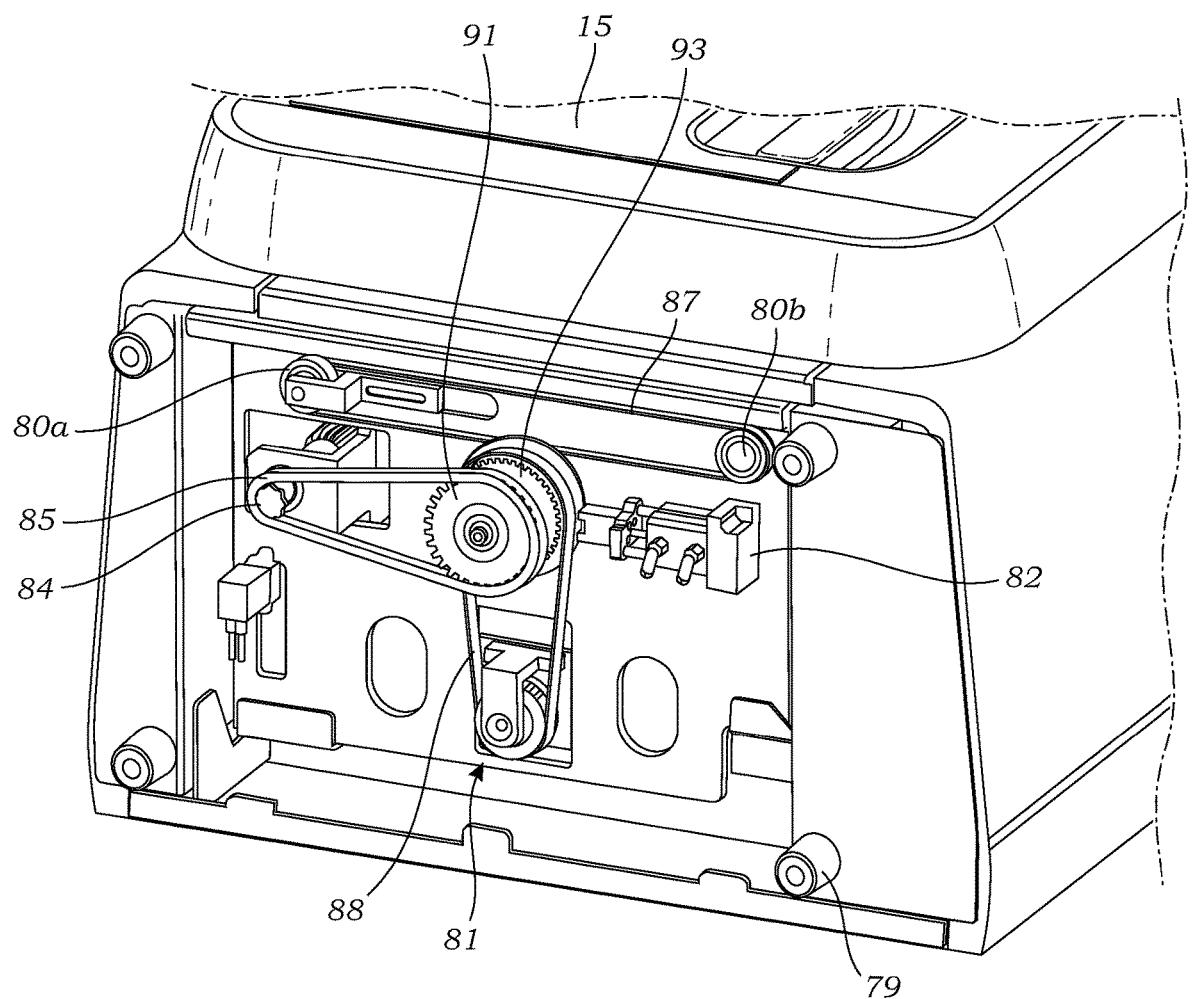
FIG. 16 is a perspective view of the bottom of the sample processing cabinet of FIG. 1, in which a bottom cover plate is removed to reveal the system components.

With brief reference also to FIG. 16, lateral translation of the pipette tip dispenser transporter 22 is performed by a motorized drive belt 87 that spins back and forth on drive wheels 80a and 80b underlying a bottom surface of the chassis 14. The drive wheels in turn rotate respective shafts (not shown) that extend back through the chassis floor and are mechanically coupled to the transporter 22 for translating same to laterally move the pipette tip holder 24 and the pipette tip dispenser 26 mounted thereon between a storage position, in which the pipette tip dispenser is located within an isolation chamber 28, as shown in FIG. 4, and a loading position as shown, in which a slot of the pipette tip holder 26 containing an available pipette tip 48 is aligned with the pipette tip engaging member 38 on the tool head 30, as shown in FIG. 7. In particular, the loading position will vary depending upon which slot(s) of the dispenser 26 are occupied by pipette tips. In the storage position, the respective pipette tip holder 24, and the pipette tip dispenser 26 mounted thereon, are positioned within an isolation chamber 28 located within the sample processing cabinet 11 in order to reduce the chances of contamination of unused tips from the sample processing activities taking place in the main interior region of the cabinet 11.

Figure 5:
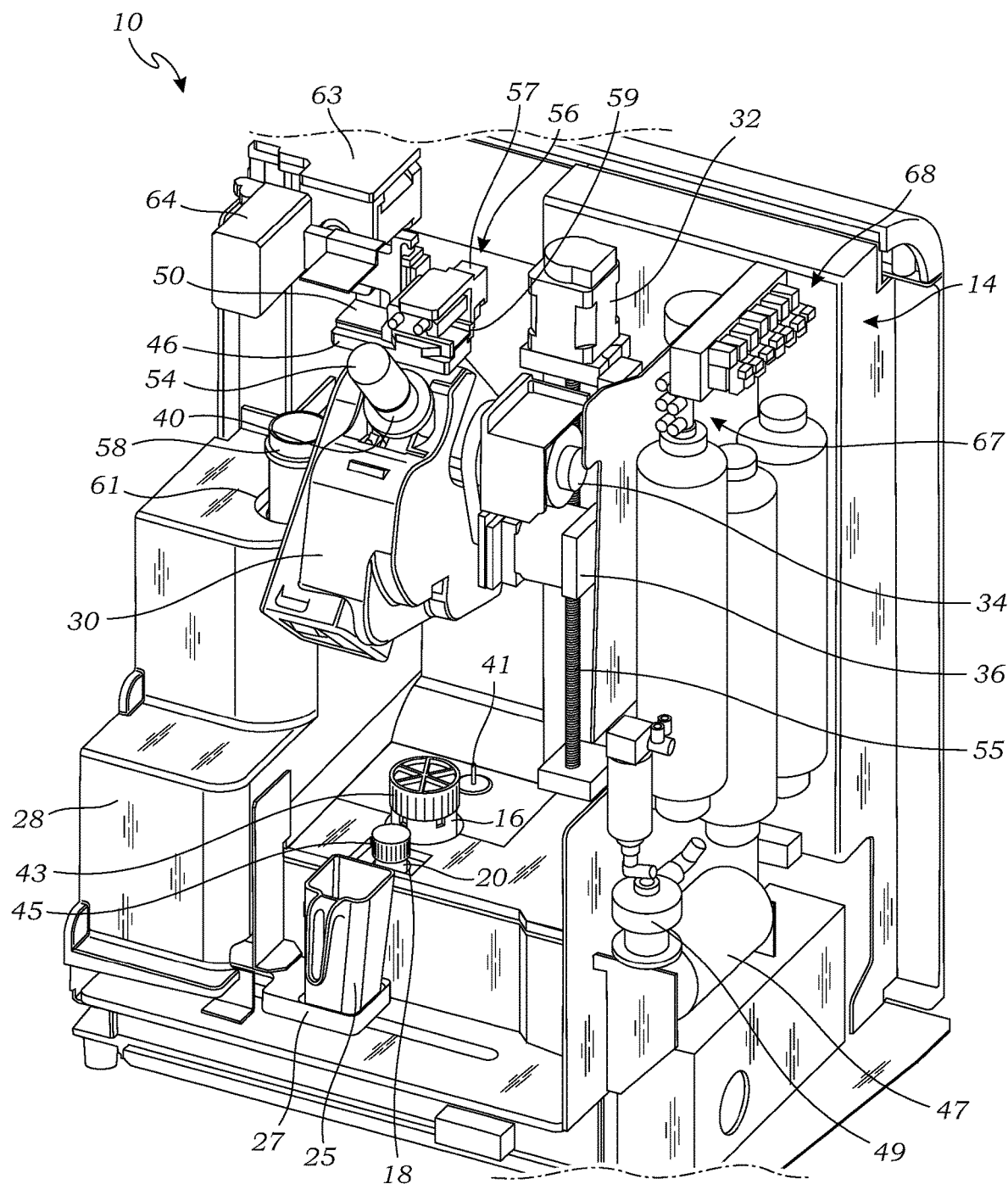

As can be seen by comparing FIG. 4 and FIG. 5, a panel 52 (FIG. 4) is attached to a side of the pipette tip dispenser 26 and is sized and shaped to close an opening through which the holder 24 and dispenser 26 enter the isolation chamber 28. As seen in FIG. 3, a pipette tip sensor 35 located in the isolation chamber 28 tracks the pipette tips 48 held in the dispenser 26 to inform the system controller 60 on same for precisely moving the pipette tip dispenser transport 22 to a location in which a tip 48 held in the dispenser 26 is aligned with the pipette tip engaging member 38 on the tool head 30, and also to ensure that there are adequate pipette tips available in the dispenser 26 to perform the particular sample processing procedure. If the dispenser 26 is empty or otherwise holds an insufficient amount of pipette tips 48 to perform a particular sample processing procedure, then system 10 will pause and not perform any further sample procedures until new pipette tips 48 have been loaded into the dispenser 26.

A used pipette tip waste bin 25 is mounted on a separate platform/holder 27 attached to the pipette tip transporter 22, wherein the pipette tip dispenser transporter is configured to selectively translate the pipette tip waste bin 25 to a location at which the tool head 30 positions the pipette tip engaging member 38 to disengage an engaged pipette tip 48 into the waste bin 25. As with the pipette tip dispenser 26 and holder 24, the waste bin 25 is preferably magnetically coupled to holder 27 for both providing stability and to allow the system 10 to confirm via a sensing circuit that the waste bin is properly attached. In particular, the pipette tip waste bin holder 27 is mounted on the pipette tip transporter 22 relative to the pipette tip dispenser holder 24 such that, when the pipette tip dispenser 26 is translated into the isolation chamber 28, the pipette tip waste bin 25 is simultaneously translated to the location at which the tool head 30 positions the pipette tip engaging member 38 to disengage an engaged/used pipette tip 48 into the waste bin 25.

Figure 15:
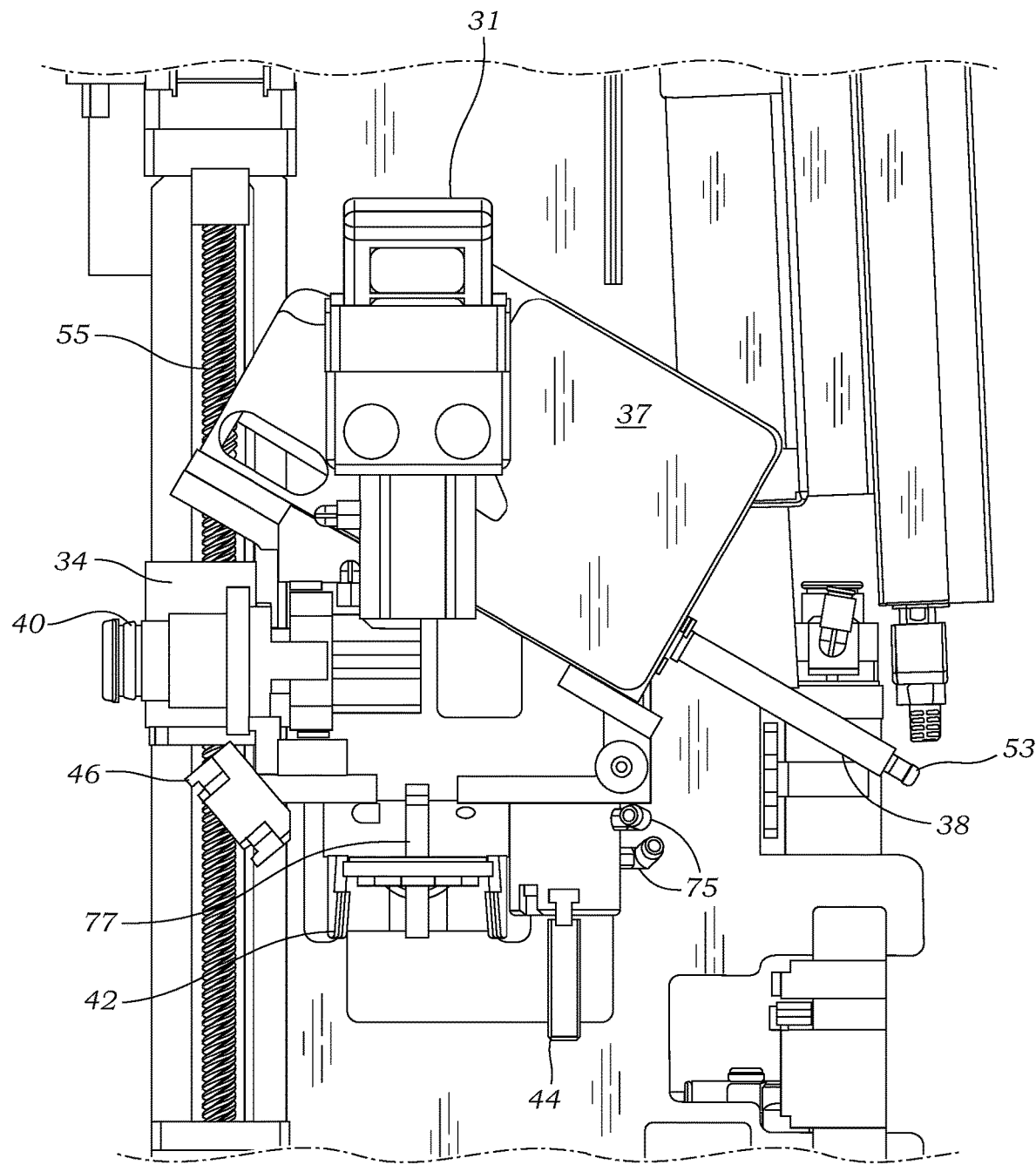
FIG. 15 is an elevated side perspective view of the components carried by a rotating tool head within the sample processing cabinet of FIG. 1, in which the covering of the tool is not shown.

With reference also to FIG. 15, the pipettor 37 is disposed on the tool head such that the pipette tip engagement member 38 is at a slight angle relative to the pipette tip dispenser 26. Similarly, are slightly angled so that the engaging member can mate to thereby engage a pipette tip 48 held in one of the slots by one or both of rotational and translational motion of the tool head 30. The pipettor 37 may be, for example and without limitation, a Cavro® Air Displacement Pipettor (ADP) sold by Tecan Group Ltd. (www.tecan.com/components), having including a spring biased engaging tip 53 (shown in FIG. 15) that releasably engages the respective pipette tips by a compression fit of the engaging tip 53 as it is inserted into the bore of a respective pipette tip 48. Once a pipette tip 48 is engaged (or installed) on the pipette tip engaging member 38, the pipettor 37 is configured to selectively draw liquid from a sample container 12 into the pipette tip 48, and to dispense the drawn liquid contained in the pipette tip 48 into an aliquot container 20, respectively.

In this manner, during a sample processing procedure, the pipettor 37 engages a pipette tip 48 from the pipette tip dispenser 26. The pipettor is then repositioned by the tool head 30 to position the engaged tip into an open container (e.g., an open sample container 12). In a known fashion, the pipette tips 48 are made of a conductive material (such as a conductive polymer) in order to use an impedance sensing circuit of the pipettor 37 to confirm that the pipette tip 48 is submerged in the liquid for drawing a sample, e.g., an aliquot from the sample container, by supplying a vacuum within the bore of the pipette tip 48 to thereby draw a volume of the sample into the pipette tip 48. The pipettor 37 dispenses the sample drawn into the pipette tip 48, e.g., into an open aliquot container 20, by releasing the vacuum allowing the sample to dispense out of the pipette tip 48. The pipettor 37 is configured and operates such that only the pipette tip 48 comes into contact with the sample material so that the pipette tip engaging member 38 of the pipettor 37 is not contaminated by the sample material. The pipette tip engaging member 38 is configured to disengage the pipette tip 48 into the waste container 25 after use by movable displacement sleeve that pushes the tip 48 off the tip 53 of the pipette tip engaging member 38.

The specimen transfer device 40 is carried by the tool head 30 and is configured to collect a specimen sample from the sample in the sample container 12 and to transfer the collected specimen sample to a slide 50. In the described embodiment, the specimen transfer device 40 includes a cylindrical working end portion that extends away from the tool head 30 and is configured to form a pressure-tight seal around its circumference with a filter 54 that is seated thereon prior to initiating a sample processing procedure, as shown in FIG. 4. The filter 54 includes a hollow cylindrical body having an open proximal end and a membrane spanning across its distal end having pores of a selected size to capture desired cells for the specimen sample and to pass smaller cells and non-cellular particles and liquids therethrough. Embodiments of the filter 54, as well as of specimen sample collection and transfer devices and techniques suitable for use with the illustrated system 10 are disclosed and further described in U.S. Pat. No. 8,119,399, U.S. Pat. Publ. No. 20050100483 and U.S. Pat. Publ. 20080145887, the disclosures of which are incorporated herein by reference in their entirety.

When installed on the working end of the specimen transfer device 40, the filter 54 extends away from the tool head 30 by a sufficient distance to allow the filter to be inserted into the sample container 12 to collect a specimen sample on the membrane of the filter 54 without the sample liquid coming into contact with any part of the specimen transfer device 40, such that only the filter contacts the sample liquid. This ensures that the specimen transfer device 40 is not contaminated by the sample material when it collects a specimen sample from the sample container 12. Once the specimen transfer device 40 has collected a specimen onto the sample collector 54, it is then manipulated to transfer the specimen from the filter 54 to the slide 50, as described in more detail below.

In particular, the specimen transfer device 40 and the system 10 are configured to insert the membrane of the filter into the sample in the sample container via one or both of translational and rotational motion of the tool head 30, and to force the sample back and forth through the membrane to collect the specimen sample onto the membrane in a "sipping" manner, which deposits a thin layer of cells in the liquid sample onto the outside surface of the membrane. The specimen transfer device 40 may be configured to cycle a vacuum (and pressure) within the working end of the specimen transfer device in order to force the sample back and forth through the membrane. In addition, or alternatively, the specimen transfer device 40 and system 10 may be configured to move the membrane up and down within the sample in order to force the sample back and forth through the membrane in order to collect the specimen sample on the membrane. Methods and apparatus for determining whether a sufficient amount, but not too many, cells have been collected by on the filter membrane using this same "sipping process" are disclosed and described in the above-incorporated U.S. Pat. No. 8,119,399. Further details of the specimen collection process in general, and of design and operation of the specimen transfer device 40 (and filter 54) is found in to U.S. Pat. No. 8,137,642, the disclosure of which is incorporated herein by reference in its entirety, as well as several other of the above-incorporated patents. With brief reference to FIG. 17, waste liquid from the specimen collection process is removed out of ports 95 located in the back of the cabinet 11.

The sample container capping device 42 comprises movable pneumatic prongs or "grippers" configured to grip and hold a cap 43 of a sample container 12. As can be seen in FIG. 15, the grippers are actuated by a pneumatic force supplied on an actuation member 77 to alternatively provide a tweezer-like radially inward gripping motion, or a radially outward release motion. The two or more grippers are preferably disposed substantially evenly about the circumference of the sample container cap 43 and can be placed into a "capping" or "uncapping" position by one or more of translational and rotational motion of the tool head 30. In the case of removing the cap 43, the capper 42 grips the cap 43 while the container holder 16 is rotating in one of a clockwise direction or counterclockwise direction, and the tool head 30 rises slightly and steadily upward to allow the cap 43 to travel upward as it rotates on the threads (not shown) of the container 12. In the case of installing a cap 43 that is held by the grippers back onto the container 12, the tool head 30 positions the capper 42 over the open container and travels slightly and steadily downward as the holder 16 rotates in the other of the clockwise direction and counterclockwise direction while the tool head 30 lowers slightly and steadily to allow the cap 43 to travel downward onto the container 12, as the container is rotated by the holder 16 relative to the cap 43. The grippers used for the sample container capping device 42, and also for the below described aliquot container capping device 44 include Parallel Style Air Gripper/2 Finger, 3 Finger and 4 Finger series grippers available from SMC Pneumatics.com.

The aliquot container capping device 44 operates substantially the same way as the sample container capper, including using two or more prongs or grippers to releasably grip the cap 45 of an aliquot container 20 while the aliquot container holder is rotated in a clockwise or counterclockwise direction to respectively remove or install the cap 45 from or onto the container 20. Again, the tool head 30 moves steadily downward or upward to accommodate the motion of the cap relative to the container 20 during the process. Notably, because less torqueing force is needed for uncapping and capping the aliquot container 20, as seen in FIG. 15, direct air pressure supplied through hose attachments 75 is used to power the aliquot container grippers.

The sample container capping device 42 and the aliquot container capping device 44 are preferably positioned and oriented on the tool head 30 so that both capping devices 42 and 44 are in proper position to remove the respective caps 43 and 45 without requiring repositioning of the tool head 30.

It should be appreciated that, in alternate embodiments, the respective cappers 42 and 44 may be rotatable, in which case the capping process would include having capper 42 grip cap 43 and rotate while the sample holder remains stationary, and capper 44 grip caps 45 and rotate while the aliquot holder 18 remains stationary, such as taught in the above-incorporated U.S. Pat. No. 9,335,336 and U.S. Pat. Publ. no. 2017/0052205.

The slide loading platform 46 is preferably positioned on the tool head 30 at a location convenient for a system operator to load a slide 50 thereon prior to a sample processing procedure, and is configured to receive and hold the slide 50 when it is loaded thereon. Although the loading platform 46 in this described embodiment is configured to receive and hold a microscope slide as the slide 50, it is to be understood that the loading platform 46 may be configured to receive and hold other types of analytic elements other than slides, depending on the type of sample specimen to be output by the system 10.

Figure 11:
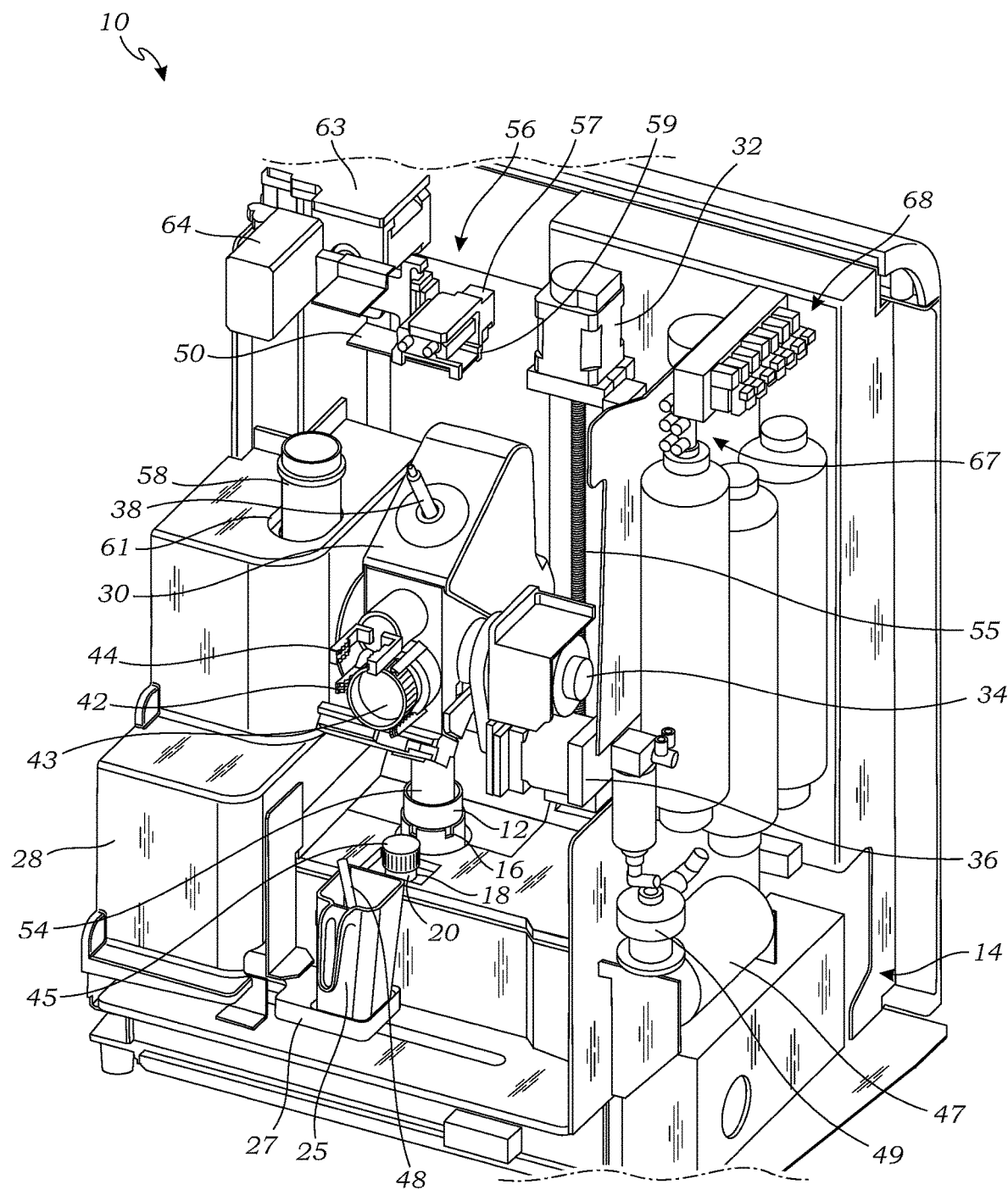

As mentioned above, the slide positioner 56 includes a slide holder 57 having pneumatic grippers 59 configured to grip and remove a slide 50 from the loading platform 46 (the transfer is seen in FIG. 5), and to thereafter position the slide for receiving the specimen sample obtained by the specimen transfer device 40. The slide positioner is also movable in at least two degrees of freedom supplied by a slide positioner motor 63, and various hinged arms, and is supported by a counterweight 64. After the membrane of the filter 54 is pressed against the slide 50 to transfer the specimen sample (FIG. 12), the slide positioner moves and rotates the slide 50 90 degrees proximate an open container of fixative 58 seated in a fixative container holder 61 includes a slide positioner 56 which is configured to grip and move the slide 50. Towards this end, the slide positioner 56 includes a pneumatically controlled gripper 59 configured to grip and thereby remove the slide 50 from the loading platform 46, as shown in FIG. 5. The slide positioner 56 then moves the slide to a transfer position in which the specimen transfer device 40 can transfer a specimen sample from the filter 54 to the slide 50 as shown in FIG. 11, and then to a fixative position in which the analytic positioner 50 can place the slide 50 into a fixative container 58 containing a fixative for affixing the specimen sample to the slide 50. The system 10 includes a fixative container holder 61.

Figure 17:
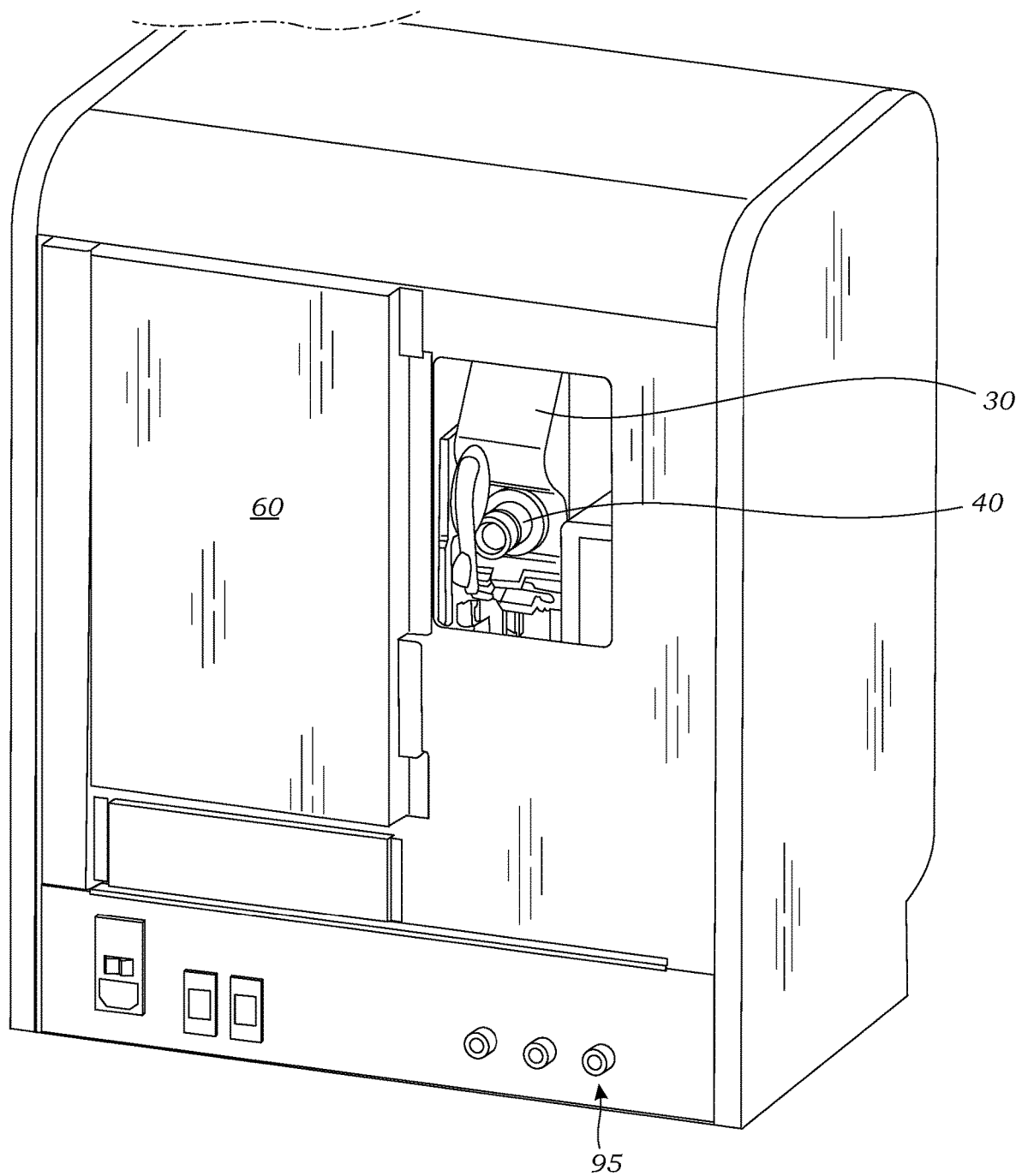
FIG. 17 is a perspective view of the back of the sample processing cabinet of FIG. 1, in which a bottom cover plate is removed to reveal the system components.

With reference to FIG. 17, the system 10 also includes one or more processors that may be collectively referred to as a controller 60 located in a back panel of the cabinet. The controller 60 is operatively coupled to, and configured to communicate with, and to control the automatic operation of, the various components of the system 10, including the tool head 30, tool head actuator 32, pipettor 37, specimen transfer device 40, first capping device 42, second capping device 44, slide positioner 56, and reader 31. The controller 60 includes a computer processor, input/output interfaces and other supporting electronics for communicating with and controlling the operation of the components of the system. The controller 60 has a user input device for allowing a system operator to input commands, data, etc. into the controller 60. The user input device may be a touchscreen/display 62, as described below. The controller 60 also has system software for programming the controller 60 to communicate with and control the system 10 to perform the process of preparing a sample specimen and/or an aliquot sample from a biological or other sample contained in a sample container 12, as described herein. In the illustrated embodiment. The touchscreen/display 62 is attached to the chassis and preferably integrated into the cabinet housing so as to be disposed to allow a system operator to input instructions (for example, if prompted by the system 10), and review status of the items performed during a sample processing procedure. The touchscreen/display 62 is configured for displaying graphics generated by the controller 60, including information regarding the operation of the system 10, such as status of the operation, data, etc. The touchscreen/display 62 may be any suitable display such as a liquid crystal display (LCD), LED display, AMOLED, etc.

An exemplary sample processing procedure will now be described with reference to FIGS. 1-14 in order to further illustrate and describe the various elements and components of the system 10. In particular, the exemplary sample processing includes initially obtaining an aliquot of the sample, and thereafter processing the sample to create a biological specimen slide. This process is described for purposes of illustration, and not limitation, and it should be understood that other types of sample processing may be performed using the disclosed and described system and variations thereof, while remaining within the scope of the present disclosure. By way of example and without limitation, each of the method of using an automated system to process a sample contained in a sample container set forth in the appended claims hereto should be considered as additional exemplary sample processing procedures that may be performed using the illustrated system 10.

To initiate processing of a given patient sample container 12, a system operator enters an instruction for same, e.g., by contacting a "start button" or similar symbol on the user interface 62. The system controller 60 causes the tool head 30 to assume an "initiation" position (if the tool head 30 is not otherwise not already in this position), in which the tool head 30 is positioned and rotated within the cabinet 11 to position the reader 31 in a convenient location for the system operator to present the sample vial 12, such as seen in FIG. 4.

After receiving a visual confirmation from the system controller 60 on the user interface display 62, the system operator presents the sample container 12 to the reader 31, so a patient and/or other indicia on the sample container 12 is within the field of view of the reader 31. The reader 31 reads the indicia on the sample container 12 and communicates same (via the controller 60) to the respective slide printer 13 and aliquot container printer 19. The slide printer automatically prints and outputs a new (i.e., unused) slide 50, wherein indicia matching or otherwise corresponding to the indicia on the sample container 12 is printed on the slide 50. The system operator also inserts a new (i.e., unused) aliquot container 20 into the aliquot container printer, which prints indicia on the aliquot container 20 that also matches or otherwise corresponds to the indicia on the sample container 12.

The pipette tip dispenser transporter 22 is moved to the loading position (FIG. 2) to expose the pipette tip dispenser 26 in case additional tips 48 must be added. Loading the system 10 with the sample container 12, the aliquot container 20, the slide 50 and the pipette tip dispenser 26 may be automated using automation such as robots, or it may be performed manually by a system operator — the later being assumed in this example for simplification. In particular, the system operator then loads the (capped) sample container 12 into the sample container holder 16 and loads the (capped) aliquot container 20 into the aliquot container holder 18, in each case after having the reader 31 read and confirm that the respective sample and aliquot container indicia match. The system operator loads the slide 50 onto the slide loading platform 46 in a face down orientation, i.e., with the side of the slide having the printed indicia and the "cell spot" area to receive the specimen sample facing downward into the platform 46, The system operator also loads a new filter 54 onto the working end of the specimen transfer device 40, and confirms that there are an adequate (at least one) number of unused pipette tips 48 in the pipette tip dispenser 26 and that the pipette tip waste bin 25 is empty. Once all of the consumables are loaded, the system operator closes the door 15 of the cabinet 11 and indicates via the user interface that the sample processing procedure may be commenced, assuming all of the system verifications are complete.

Notably, the system 10 will not initiate the sample processing procedure unless the sensor 35 indicates that a sufficient number of pipette tips 48 are in the dispenser 26, even if this means just one, and also that the pipette tip dispenser 26 and waste bin 25 are properly seated and magnetically coupled to their respective mounting platforms 24 and 27 on the pipette tip dispenser transporter 22. The specimen transfer device 40 performs a "dry" test to verify the integrity of the filter 54, in particular, to confirm distal end membrane has not been punctured (indicating the filter 54 has been previously used) or otherwise occluded or torn. Notably, once it is confirmed that there are adequate pipette tips 48, the pipette tip dispenser transporter is moved by the system so that the pipette tip dispenser is located in the isolation chamber 28 From that point until the sample processing procedure is completed, no further system operator involvement is normally required.

Figure 6:
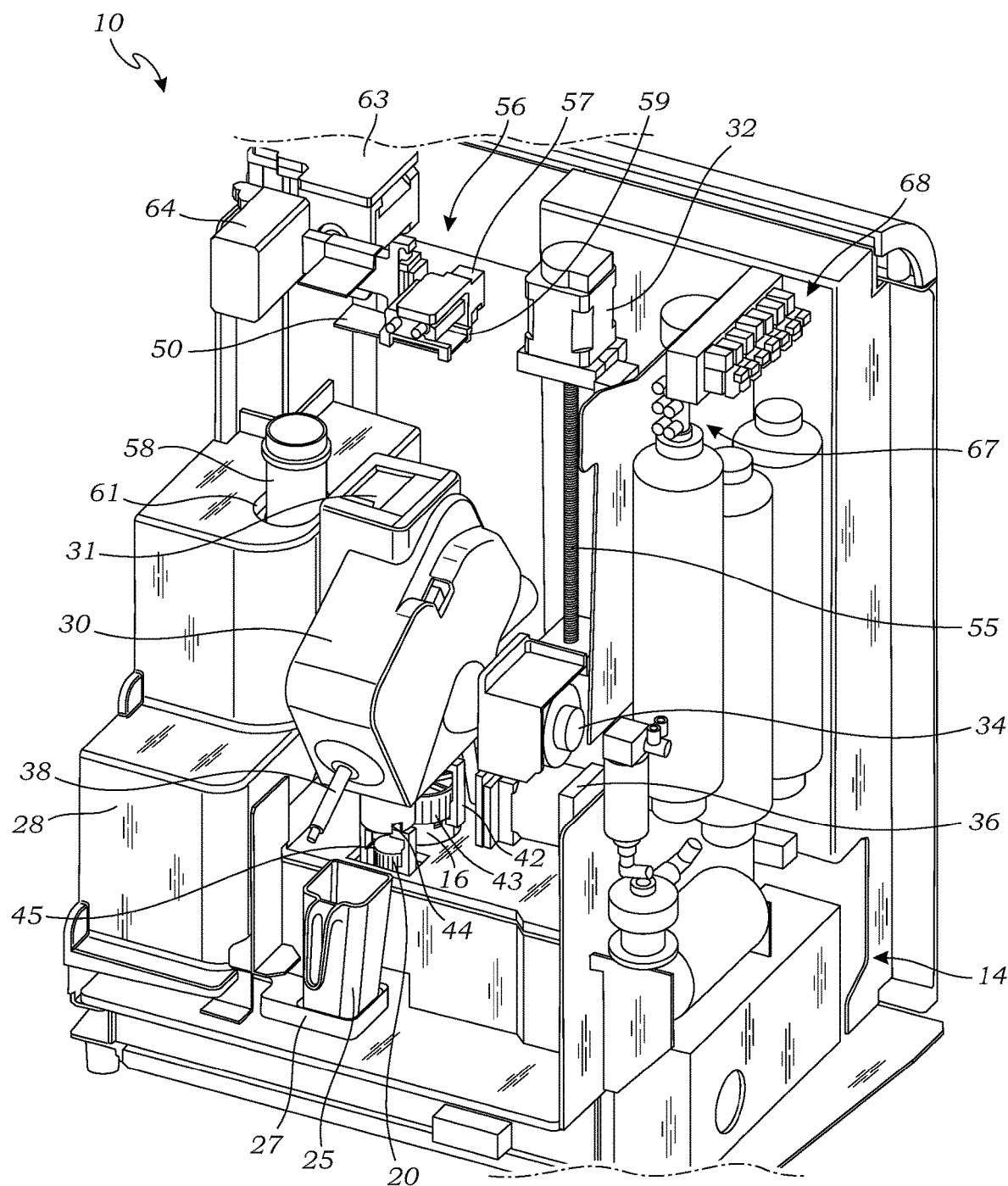

As shown in FIGS. 4-6, at the beginning of the sample processing procedure, the pipette tip dispenser transporter 22 moves the pipette tip dispenser into the storage position in the isolation chamber 28 (FIG. 3), and the tool head 30 rotates slightly upwards and also linearly translates upward so that the slide 50 may be griped by the grippers 59 of the slide holder 57. The tool head 30 then linearly translates downward and rotates so that the indicia on the side 50 may be read by the reader 31 to confirm the indicia matches that of the respective sample container 12 and aliquot container 20. Assuming the match is verified, the system 10 continues with the then performs an automated process to prepare a specimen sample and an aliquot sample with each of the components of the system 10 operated and controlled by the controller 60.

As shown in FIG. 6, the tool head 30 is rotated and moved vertically downward by the tool head actuator 34 to position the sample container capping device 42 over the cap 43 on the sample container 42 and the aliquot container capping device 44 over the second cap 45 on the aliquot container 20. The respective capping devices 42 and 44 remove and grip the caps 43 and 45 in cooperation with rotation of the respective container holders 156 and 18.

As shown in FIG. 7, the pipette tip dispenser transporter 22 moves to the loading position to position a pipette tip 48 contained in the pipette tip dispenser 26 to be installed on the pipette tip engaging member 38 of the pipettor 37. Also shown in FIG. 7, the tool head 30 rotates to position the pipette tip engaging member 38 to install the pipette tip 48 by respective rotation and translation of the tool head 30 to push the pipette tip engaging member into the pipette tip 48.

Figure 8:
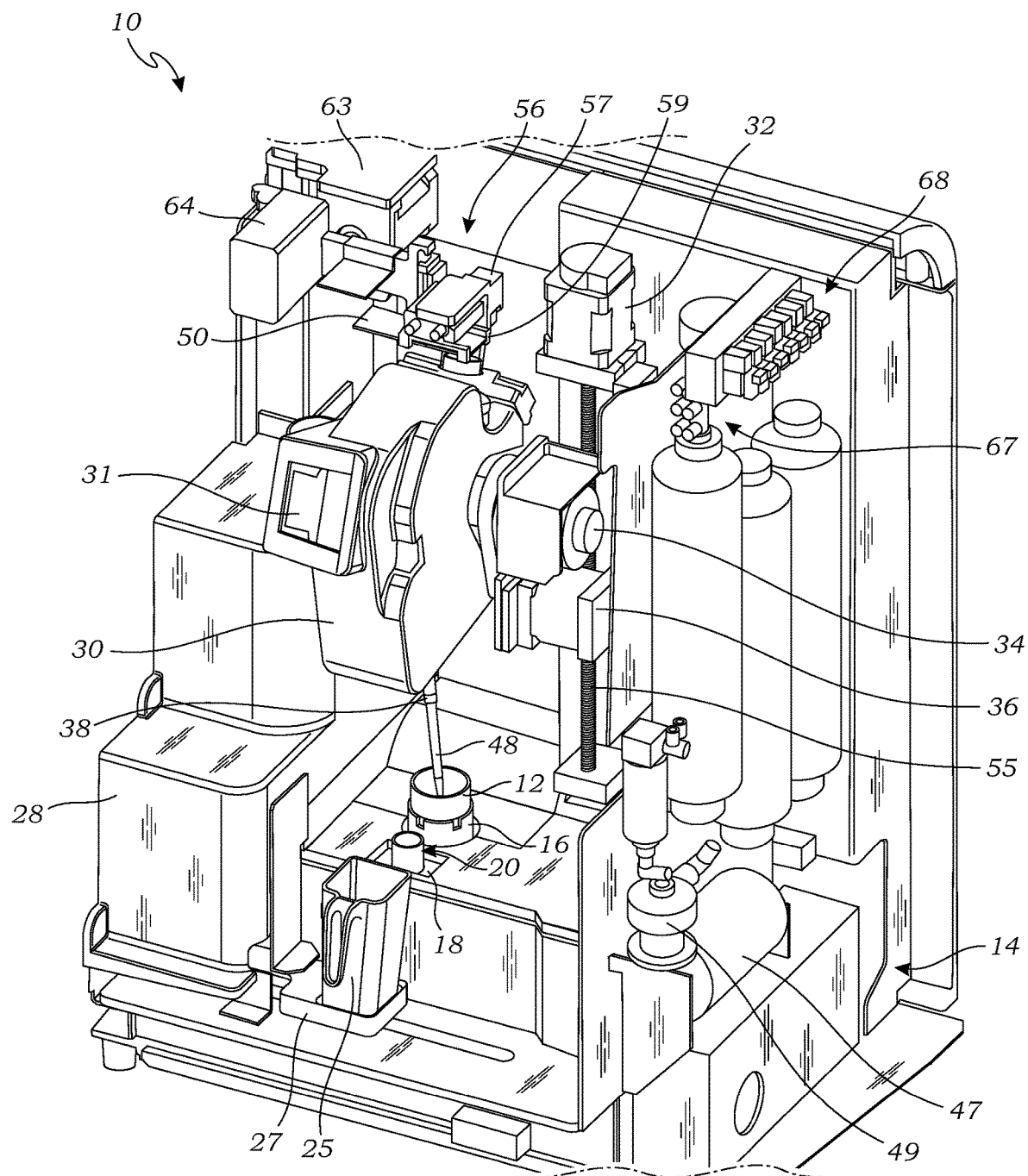

As shown in FIG. 8, the pipette tip dispenser transporter 22 moves back to the storage position. The tool head 30 rotates and translates vertically to place the pipette tip 48 on the pipettor 37 into the sample in the sample container 12. The pipettor 37 draws a vacuum within the pipette tip 48 to draw a volume of the sample (the aliquot sample) into the pipette tip 48.

Figure 9:
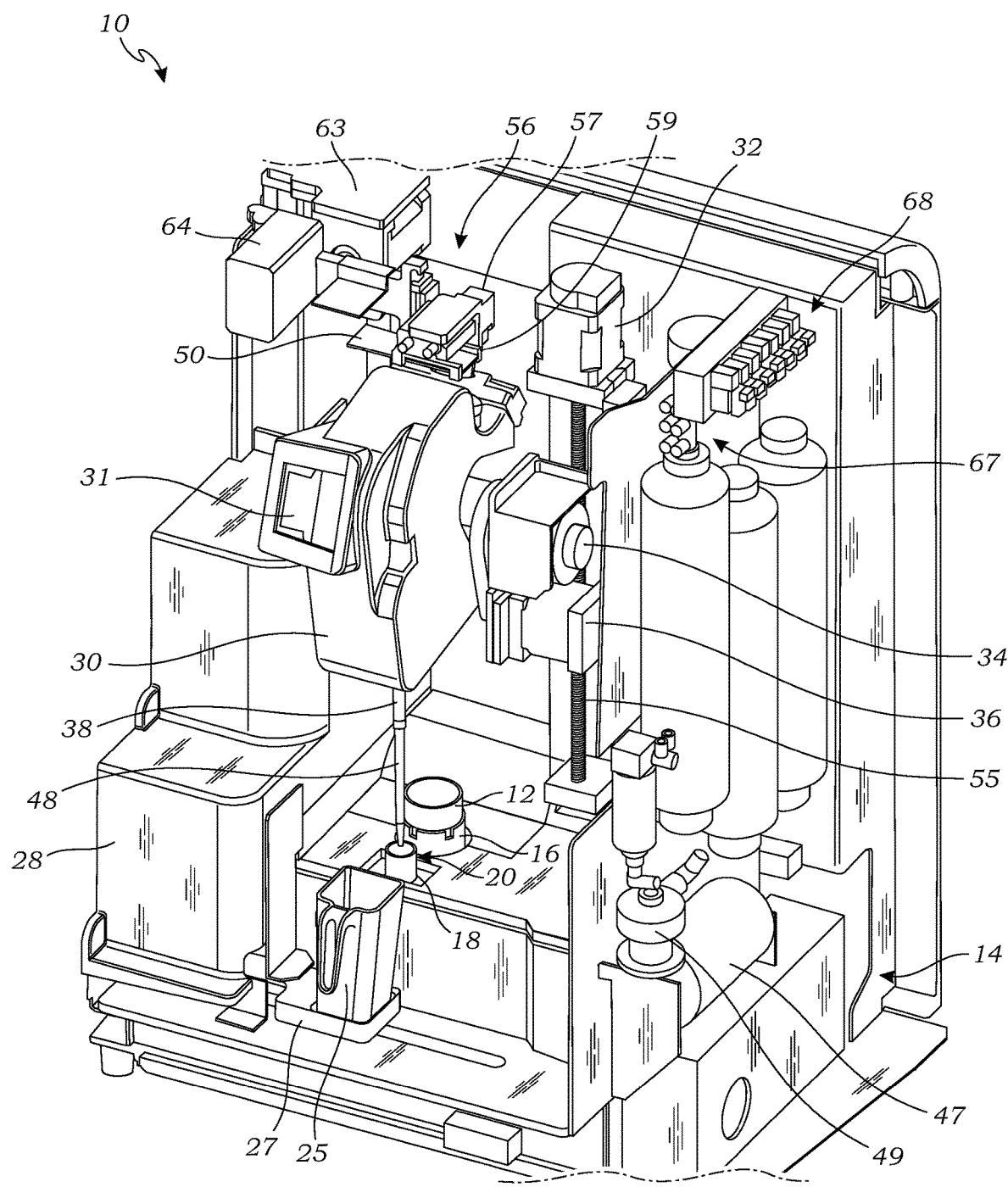

As shown in FIG. 9, the tool head 30 rotates and translates vertically to position the pipette tip 48 in the aliquot container 20. The pipettor 37 releases the vacuum to dispense the aliquot sample out of the pipette tip 48 and into the aliquot container 20. After the aliquot sample has been dispensed into the aliquot container 20, the tool head 30 is rotated and translated to position the aliquot container capping device 44 in position to reinstall the cap 45 back onto the aliquot container 20 (same position as shown in FIG. 6).

Figure 10:
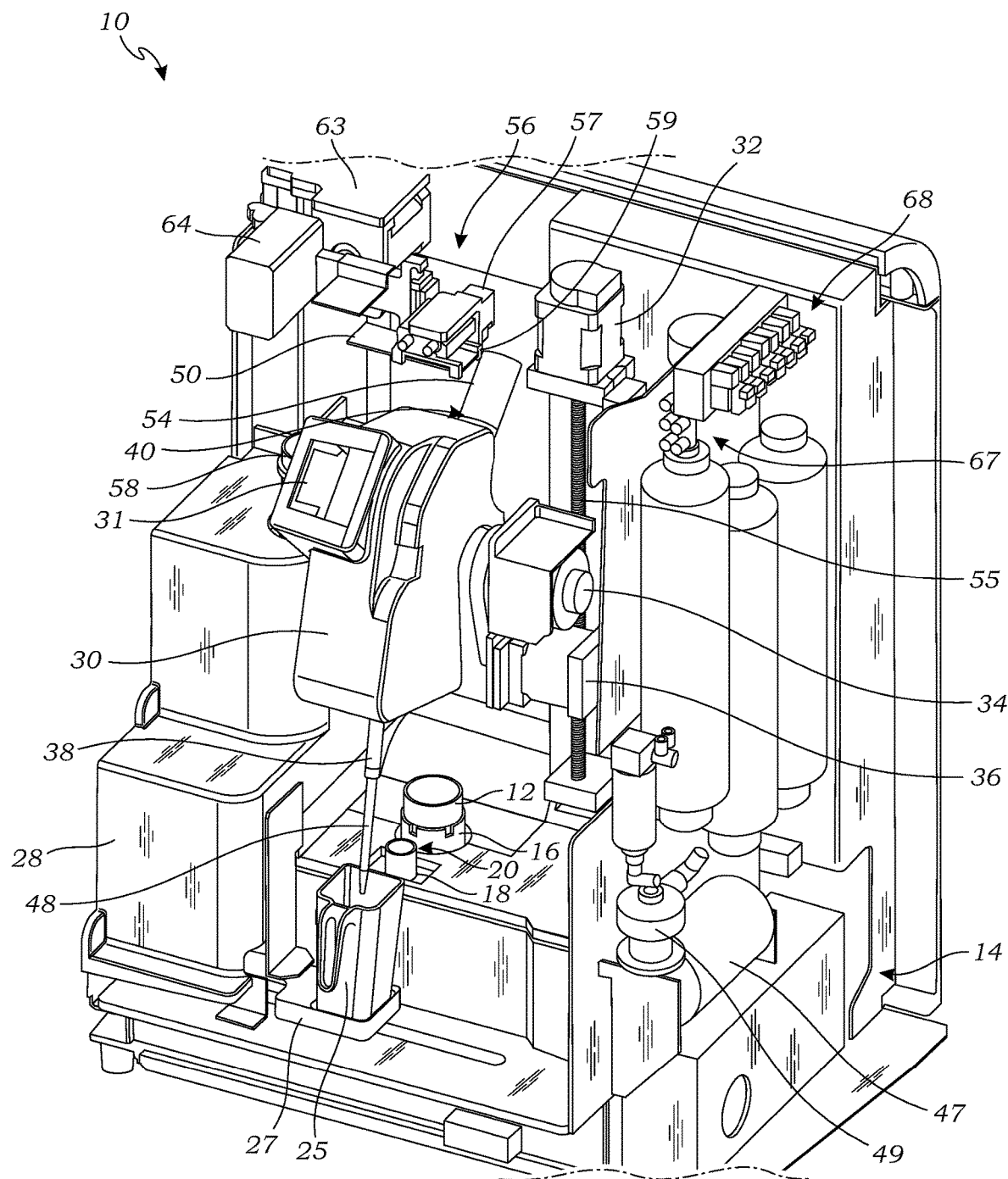

As shown in FIG. 10, the tool head 30 is rotated and translated to position the pipette tip 48 over or within the waste container 25. The pipette tip engaging member 38 then disengages (ejects) the used pipette tip 48 into the waste container 25.

As shown in FIG. 11, the tool head 30 is rotated and translated to position the filter 54 installed on the specimen transfer device 40 in position to collect a specimen sample from the sample container 20 onto the filter membrane according to the process described above, i.e., forcing the sample back and forth through the membrane either by a cycling vacuum and/or by moving the filter up and down, such as by moving the tool head 30 via the tool head actuator 34. This process allows a thin layer or single layer of cells, to be collected on the membrane.

Figure 12:
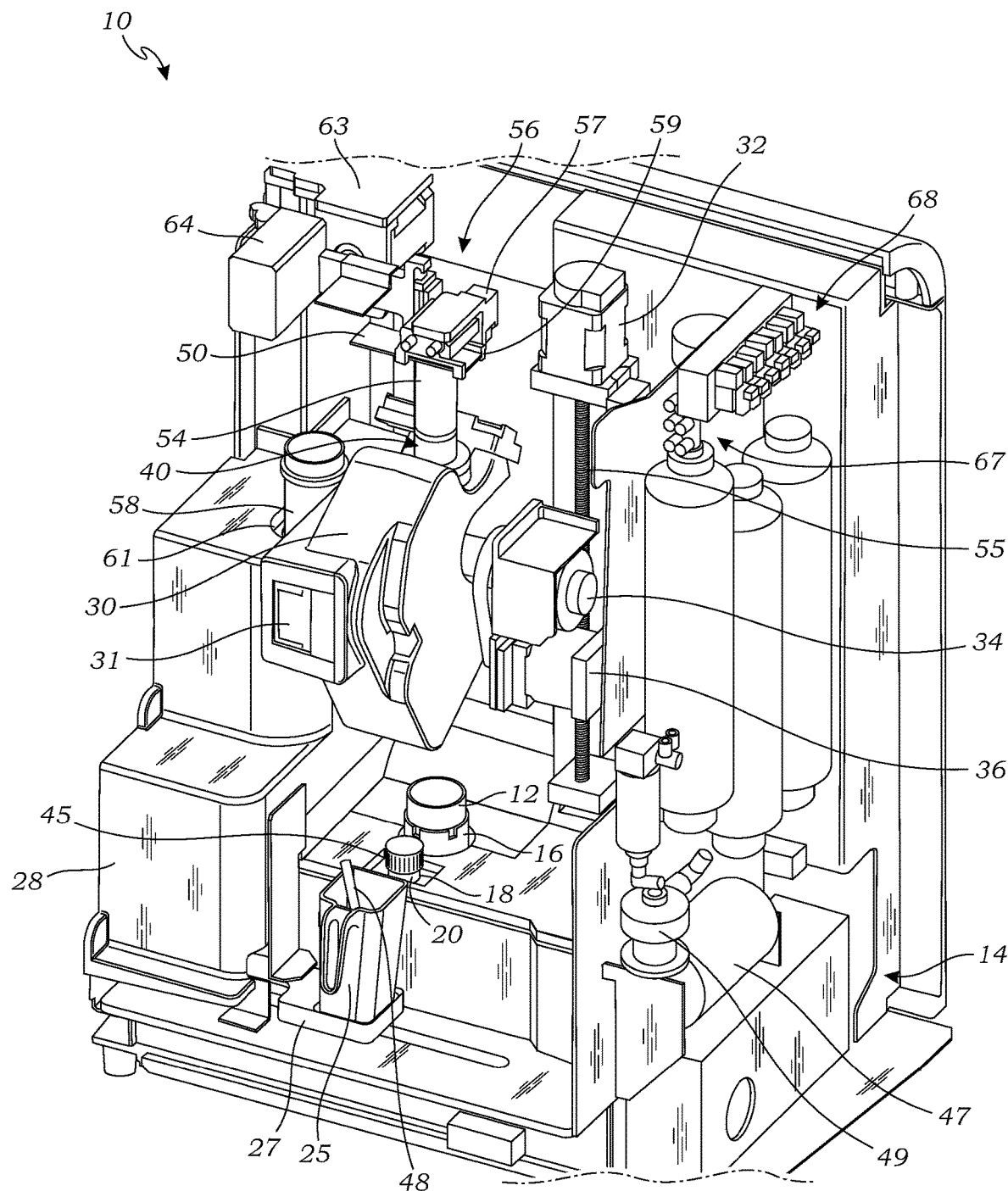

As shown in FIG. 12, the tool head 30 is rotated and translated to position the filter membrane in position to transfer the specimen sample to the slide 50 held by the grippers 59 of the slide holding device 57. The specimen transfer device 40 and/or the slide positioner 56 are then manipulated to contact the membrane having the specimen sample thereon onto the slide 50. The tool head 30 may be moved via the tool head actuator 34 to manipulate the specimen transfer device 40. In order to provide for transfer of the specimen sample (e.g., a thin layer of cells) to the slide 50 without disturbing the spatial distribution thereof, it is desirable that the membrane of the filter 54 first contact the slide 50 generally at a single location, forming a predetermined small pre-contact angle between the membrane and a deposition surface of the slide 50, and then gently and gradually enter into complete contact with the slide 50. This may be accomplished by manipulating the specimen transfer device 40 and the slide positioner 56 in coordination.

Figure 13:
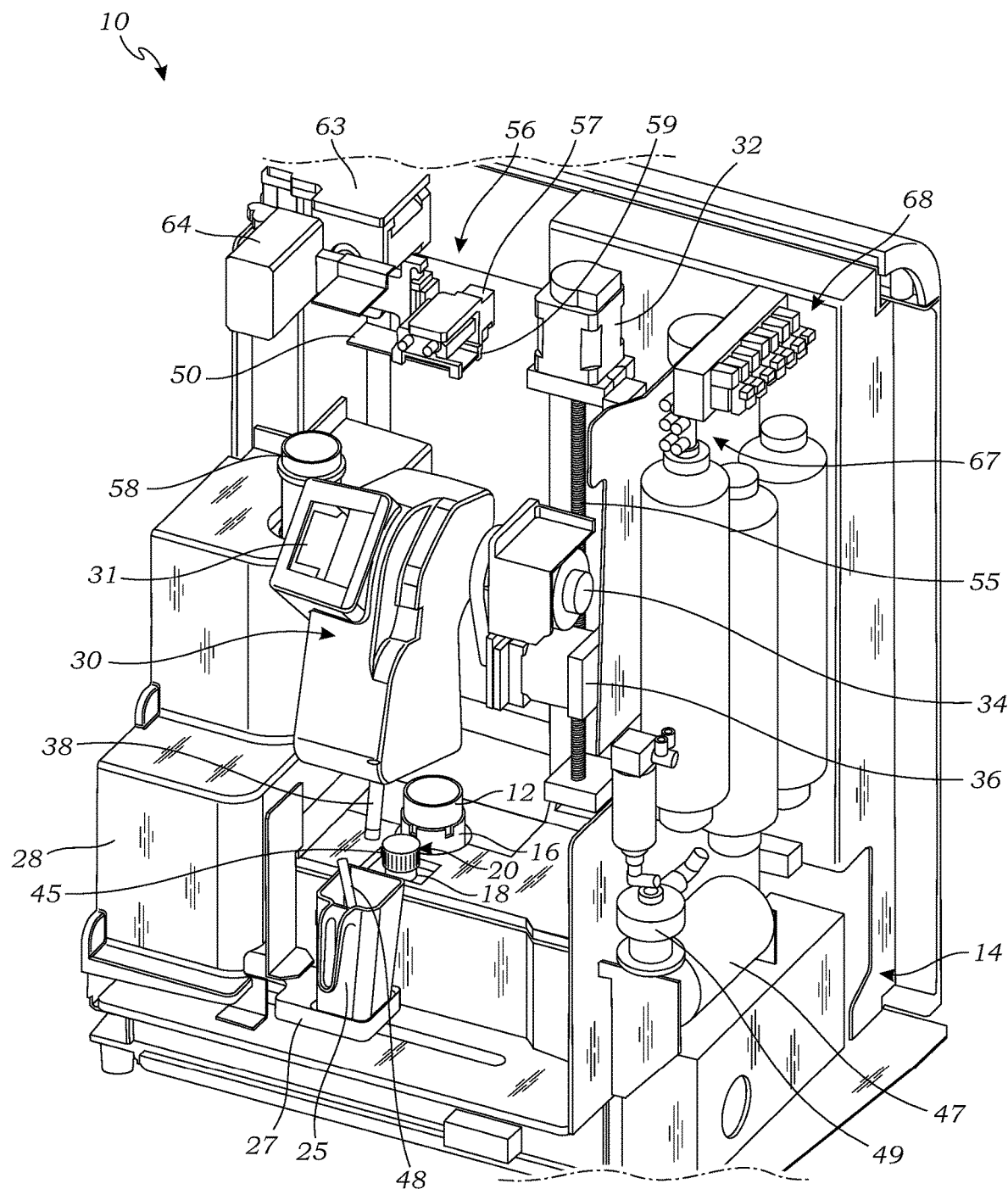
Figure 14:
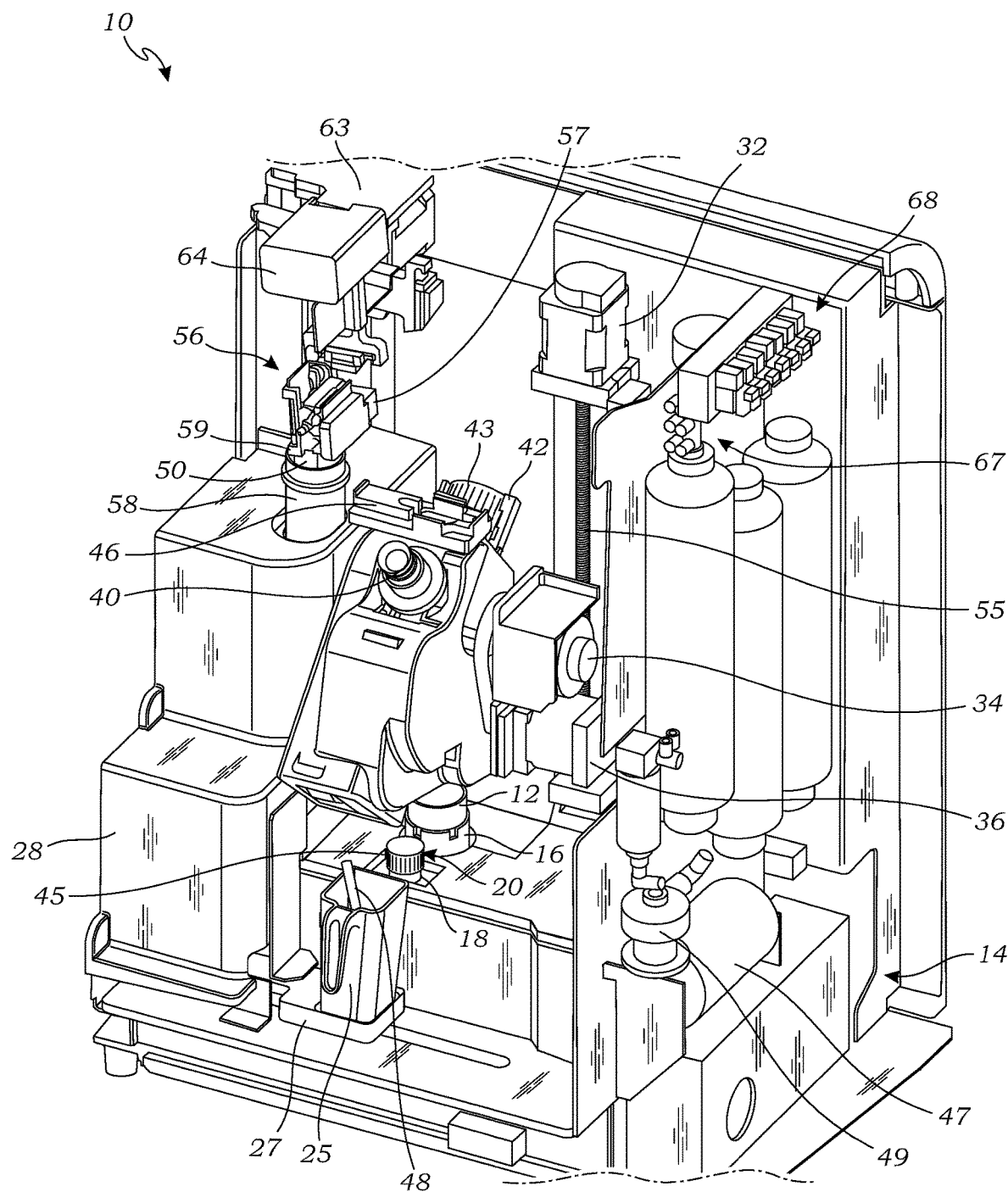

As shown in FIG. 13, the tool head 30 is moved downward and may also be rotated to provide room for the slide positioner 56 to place the slide 50 having the specimen sample thereon into a fixative container 58 containing fixative for affixing the specimen sample onto the slide 50. After transferring the specimen sample to the slide 50, the tool head 30 translates and/or rotates to drive the filter membrane into a pin 41 (FIG. 4) in order to destroy the filter membrane to prevent reuse. As also shown in FIG. 13, the slide positioner 56 is actuated to place the slide 50 having the specimen sample thereon into the fixative container 58. Once the sample processing procedure is completed, a system operator may remove the specimen slide 50 from the fixative solution in container 58, or alternatively may remove the fixative container, including the specimen slide 50, and replace the fixative container 58 (or place a new one) in the holder 61 prior to commencing a new sample processing procedure.

The tool head 30 is rotated and moved downward to position the sample container capping device 42 in position to reinstall the cap 43 back onto the sample container 12 (same position as shown in FIG. 4).

This completes the automated process for preparing the specimen sample and aliquot sample. The slide 56 having the specimen sample affixed thereon by the fixative can then be removed from the fixative container 58 and utilized for testing. The sample container 12 and the aliquot container 20 may also be removed from the system 10 and stored appropriately. The waste container 25 is removed from the system 10 and dumped into a waste bin to dispose of the used pipette tip 48. The waste container 25 may then be placed back onto the waste container platform 27.

The process as described may be repeated for additional sample containers having respective sample contained therein, as desired.

Although particular embodiments have been shown and described, it is to be understood that the above description is not intended to limit the scope of these embodiments. While variations of the many aspects of the herein disclosed embodiments have been illustrated disclosed and described, it should be appreciated that the foregoing disclosure is provided for purposes of explanation and illustration only, and that various changes and modifications may be made to the disclosed embodiments without departing from the scope of the following claims. For example, not all of the components depicted and described in the embodiments are necessary, and the alternative embodiments may include any suitable combinations of the described components, and the general shapes and relative sizes of the components may be modified.

What is claimed is:

1. An automated system for processing a sample contained in a liquid sample container, the system comprising:
    a sample container holder configured for holding a sample container;
    an automated tool head configured to rotate about a first axis, and to translate along a second axis different than the first axis;
    a pipette tip dispenser;
    a pipette tip dispenser transporter;
    a pipettor carried by the tool head, the pipettor having a pipette tip engaging member configured to releasably engage pipette tips, wherein the tool head is configured to automatically position the pipette tip engaging member relative to the pipette tip dispenser to allow the pipette tip engaging member to engage a pipette tip held by the pipette tip dispenser through one or both of rotation of the tool head about the first axis and translation of the tool head along the second axis, wherein the pipette tip dispenser is mounted on the pipette tip dispenser transporter, the pipette tip dispenser transporter being configured to translate the pipette tip dispenser relative to the tool head so that the pipette tip dispenser may be selectively translated to a location at which the tool head positions the pipette tip engaging member to engage a pipette tip from the pipette tip dispenser; and
    a pipette tip dispenser isolation chamber, wherein the pipette tip dispenser transporter is configured to selectively translate the pipette tip dispenser between the location at which the tool head positions the pipette tip engaging member to engage a pipette tip from the pipette tip dispenser and a second location within the isolation chamber.

2. The system of claim 1, further comprising a sample container capping device disposed on the tool head and configured to controllably grip and release a cap of a sample container held in the sample container holder, wherein the tool head is configured to automatically position the sample container capping device relative to the sample container cap through one or both of rotation of the tool head about the first axis and translation of the tool head along the second axis, and wherein the sample container capping device operatively cooperates with the sample container holder to remove or install the sample container cap.

3. The system of claim 2, wherein the sample container holder is configured to automatically rotate in one of a clockwise rotational direction and a counter-clockwise rotational direction while the sample container capping device engages the sample container cap in order to remove the sample container cap from the sample container, and wherein the sample container holder is configured to automatically rotate in the other one of the clockwise rotational direction and the counter-clockwise rotational direction while the sample container capping device engages the sample container cap in order to install the sample container cap onto the sample container.

4. The system of claim 1, further comprising a pipette tip waste bin, wherein the pipette tip dispenser and the pipette tip waste bin are disposed side-by-side on the pipette tip dispenser transporter, the pipette tip dispenser transporter being further configured to automatically translate the waste bin relative to the tool head so that the pipette tip waste bin may be selectively translated to a location at which the tool head positions the pipette tip engaging member to allow the pipette tip engaging member to release a pipette tip into the pipette tip waste bin.

5. The system of claim 1, further comprising:
    a controller for controlling operation of at least one of the tool head and the pipettor; and
    a user interface operatively coupled with the controller and configured for displaying system status and/or inquiries to a user and for receiving user inputs in response to the displayed system status and/or inquiries.

6. The system of claim 1, further comprising:
    a supplemental container holder configured for holding a supplemental container, wherein the tool head is configured to automatically position the pipette tip engaging member into a position in which an engaged pipette tip is inserted into a sample container held in the sample container holder, and into a position in which an engaged pipette tip is inserted into a supplemental container held in the supplemental container holder, respectively, through one or both of rotation of the tool head about the first axis and translation of the tool head along the second axis.

7. The system of claim 6, further comprising a supplemental container capping device disposed on the tool head and configured to controllably grip and release a cap of a supplemental container held in the supplemental container holder, wherein the tool head is configured to automatically position the supplemental container capping device relative to the supplemental container cap through one or both of rotation of the tool head about the first axis and translation of the tool head along the second axis, and wherein the supplemental container capping device operatively cooperates with the supplemental container holder to remove or install the supplemental container cap.

8. The system of claim 7, wherein the supplemental container holder is configured to automatically rotate in one of a clockwise rotational direction and a counter-clockwise rotational direction while the supplemental container capping device engages the supplemental container cap in order to remove the supplemental container cap from the supplemental container, and wherein the supplemental container holder is configured to automatically rotate in the other one of the clockwise rotational direction and the counter-clockwise rotational direction while the supplemental container capping device engages the supplemental container cap in order to install the supplemental container cap onto the supplemental container.

9. The system of claim 8, further comprising a supplemental container held in the supplemental container holder.

10. The system of claim 9, wherein the supplemental container is an aliquot container, and wherein the tool head and pipettor are configured to operatively cooperate to automatically cause the pipette tip engaging member to engage a pipette tip from the pipette tip dispenser, draw an aliquot of a sample from a sample container held in the sample container holder using the engaged pipette tip, and dispense the obtained sample aliquot into the aliquot container.

11. The system of claim 9, wherein the supplemental container is a reagent container containing a reagent, and wherein the tool head and pipettor are configured to operatively cooperate to automatically cause the pipette tip engaging member to engage a pipette tip from the pipette tip dispenser, draw an aliquot of reagent from the reagent container using the engaged pipette tip, and dispense the reagent aliquot into a sample container held in the sample container holder.

12. The system of claim 10, further comprising:
a reader configured for reading sample container indicia located on a sample container; and
an aliquot container printer in communication with reader and configured for printing analytic element indicia corresponding to sample container indicia read by the reader onto an aliquot container.

13. The system of claim 12, wherein the reader is positioned on the tool head.

14. The system of claim 6, further comprising:
a controller for controlling operation of at least one of the tool head and the pipettor;
a user interface operatively coupled with the controller and configured for displaying system status and/or inquiries to a user, and for receiving user inputs in response to the displayed system status and/or inquiries.

15. The system of claim 2, further comprising a pipette tip waste bin, wherein the pipette tip dispenser and the pipette tip waste bin are disposed side-by-side on the pipette tip dispenser transporter, the pipette tip dispenser transporter being further configured to automatically translate the waste bin relative to the tool head so that the pipette tip waste bin may be selectively translated to a location at which the tool head positions the pipette tip engaging member to allow the pipette tip engaging member to release a pipette tip into the pipette tip waste bin.

16. The system of claim 3, further comprising a pipette tip waste bin, wherein the pipette tip dispenser and the pipette tip waste bin are disposed side-by-side on the pipette tip dispenser transporter, the pipette tip dispenser transporter being further configured to automatically translate the waste bin relative to the tool head so that the pipette tip waste bin may be selectively translated to a location at which the tool head positions the pipette tip engaging member to allow the pipette tip engaging member to release a pipette tip into the pipette tip waste bin.

17. The system of claim 2, further comprising:
a controller for controlling operation of at least one of the tool head and the pipettor; and
a user interface operatively coupled with the controller and configured for displaying system status and/or inquiries to a user and for receiving user inputs in response to the displayed system status and/or inquiries.

18. The system of claim 3, further comprising:
a controller for controlling operation of at least one of the tool head and the pipettor; and
a user interface operatively coupled with the controller and configured for displaying system status and/or inquiries to a user and for receiving user inputs in response to the displayed system status and/or inquiries.

19. The system of claim 4, further comprising:
a controller for controlling operation of at least one of the tool head and the pipettor; and
a user interface operatively coupled with the controller and configured for displaying system status and/or inquiries to a user and for receiving user inputs in response to the displayed system status and/or inquiries.

20. The system of claim 15, further comprising:
a controller for controlling operation of at least one of the tool head and the pipettor; and
a user interface operatively coupled with the controller and configured for displaying system status and/or inquiries to a user and for receiving user inputs in response to the displayed system status and/or inquiries.

* * * * *